(12) United States Patent
Ueno et al.

(10) Patent No.: US 9,158,732 B2
(45) Date of Patent: Oct. 13, 2015

(54) DISTRIBUTED CACHE SYSTEM FOR DELIVERING CONTENTS TO DISPLAY APPARATUS

(71) Applicant: FUJITSU LIMITED, Kawasaki-shi (JP)

(72) Inventors: Hitoshi Ueno, Kawasaki (JP);
Kazumine Matoba, Shinjuku (JP);
Kenichi Abiru, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 366 days.

(21) Appl. No.: 13/719,401

(22) Filed: Dec. 19, 2012

(65) Prior Publication Data

US 2013/0227049 A1   Aug. 29, 2013

(30) Foreign Application Priority Data

Feb. 29, 2012   (JP) ................. 2012-044716

(51) Int. Cl.
*G06F 15/16*    (2006.01)
*G06F 15/167*   (2006.01)
*G06F 17/30*    (2006.01)

(52) U.S. Cl.
CPC ........ *G06F 15/167* (2013.01); *G06F 17/30902* (2013.01)

(58) Field of Classification Search
USPC ......... 709/201, 203, 213, 214, 217, 219, 223, 709/224, 226
See application file for complete search history.

(56) References Cited

U.S. PATENT DOCUMENTS 5,740,369 A    4/1998  Yokozawa et al.
2002/0016162 A1  2/2002  Toshihara et al.

2004/0260769 A1  12/2004  Yamamoto
2006/0202834 A1  9/2006   Moriwaki
2008/0216177 A1  9/2008   Yokosato et al.
(Continued)

FOREIGN PATENT DOCUMENTS

EP    1091521    4/2001
JP    2001-111605  4/2001
(Continued)

OTHER PUBLICATIONS

Matoba Kazumine et al., "Service Oriented Network Architecture for Scalable M2M and Sensor Network Services", Intelligence in Next Generation Networks (ICIN), 2011 15th International Conference on Oct. 4-7, 2011, pp. 35-40.
(Continued)

*Primary Examiner* — Viet Vu
(74) *Attorney, Agent, or Firm* — Fujitsu Patent Center

(57) ABSTRACT

A disclosed system includes a first computer that stores data, a display apparatus that is capable of reading a user identifier, a second computer, and plural third computers. The second computer includes a data storage unit storing first correlation data to correlate a user identifier with at least one third computer, and a controller that refers to the first correlation data upon detecting an event data, identifies a third computer correlated with a first user identifier included in the event data, and transmits the first user identifier to the identified third computer. Each third computer includes a receiver that receives the first user identifier, a storing unit that obtains from the first computer, and stores data identified based on the received first user identifier, and a controller to transmit data corresponding to a second user identifier, which was received from the display apparatus, based on the second user identifier.

15 Claims, 27 Drawing Sheets

(56) References Cited

U.S. PATENT DOCUMENTS

2011/0029670 A1* 2/2011 Klein et al. ............... 709/225
2012/0117240 A1* 5/2012 Omar ........................ 709/226

FOREIGN PATENT DOCUMENTS

| JP | 2002-034073 | | 1/2002 |
|---|---|---|---|
| JP | 2002-049766 | A | 2/2002 |
| JP | 2003-030037 | A | 1/2003 |
| JP | 2004-102950 | | 4/2004 |
| JP | 2004-287934 | | 10/2004 |
| JP | 2005-010970 | A | 1/2005 |
| JP | 2006-196008 | | 7/2006 |
| JP | 2008-210331 | A | 9/2008 |
| JP | 2009-110122 | | 5/2009 |
| JP | 2009-193440 | A | 8/2009 |
| JP | 2009-210887 | | 9/2009 |
| WO | 02/41180 | A1 | 5/2002 |
| WO | 2006/092840 | A1 | 9/2006 |

OTHER PUBLICATIONS

Japanese Office Action (JPOA) mailed Jun. 30, 2015 for corresponding Japanese Patent Application No. 2012-044716 with partial English Translation, 7 pages.

U.S. Non-Final Office Action mailed May 7, 2015 for related U.S. Appl. No. 13/607,135, 11 pages.

Japanese Office Action (JPOA) mailed Apr. 14, 2014 for Japanese Patent Application No. 2011-204583 with partial English Translation, 6 pages.

* cited by examiner

| USER ID | DISPLAY APPARATUS ID |
|---------|---------------------|
| u123 | d100 |
| ⋮ | ⋮ |

| DISPLAY APPARATUS ID | CS ADDRESS |
|---------------------|------------|
| d100 | 10.25.25.10 |
| ⋮ | ⋮ |

| USER ID | CONTENTS ID |
|---|---|
| u123 | c20 |
| ⋮ | ⋮ |

FIG.8

| CONTENTS ID | CONDITION | STORAGE DESTINATION | USER ID OF USER WHO LASTLY USED | DATE OF LAST UTILIZATION |
|---|---|---|---|---|
| c20 | Temp<10 | d:¥a1.mpg | u123 | 10:10 |
| | Temp≧10 | d:¥a2.mpg | | |
| ⋮ | ⋮ | ⋮ | ⋮ | ⋮ |

FIG.9

| PARAMETER NAME | VALUE |
|---|---|
| ERROR PROCESSING FLAG | All ( OR Zero ) |

FIG.11

| CONTENTS ID | USER ID |
|---|---|
| c20 | u123 |
| c20 | u222 |
| c20 | u333 |
| ⋮ | ⋮ |

| USER ID | DISPLAY APPARATUS ID |
|---|---|
| u123 | d100 |
| u222 | d101 |
| u333 | d201 |
| ⋮ | ⋮ |

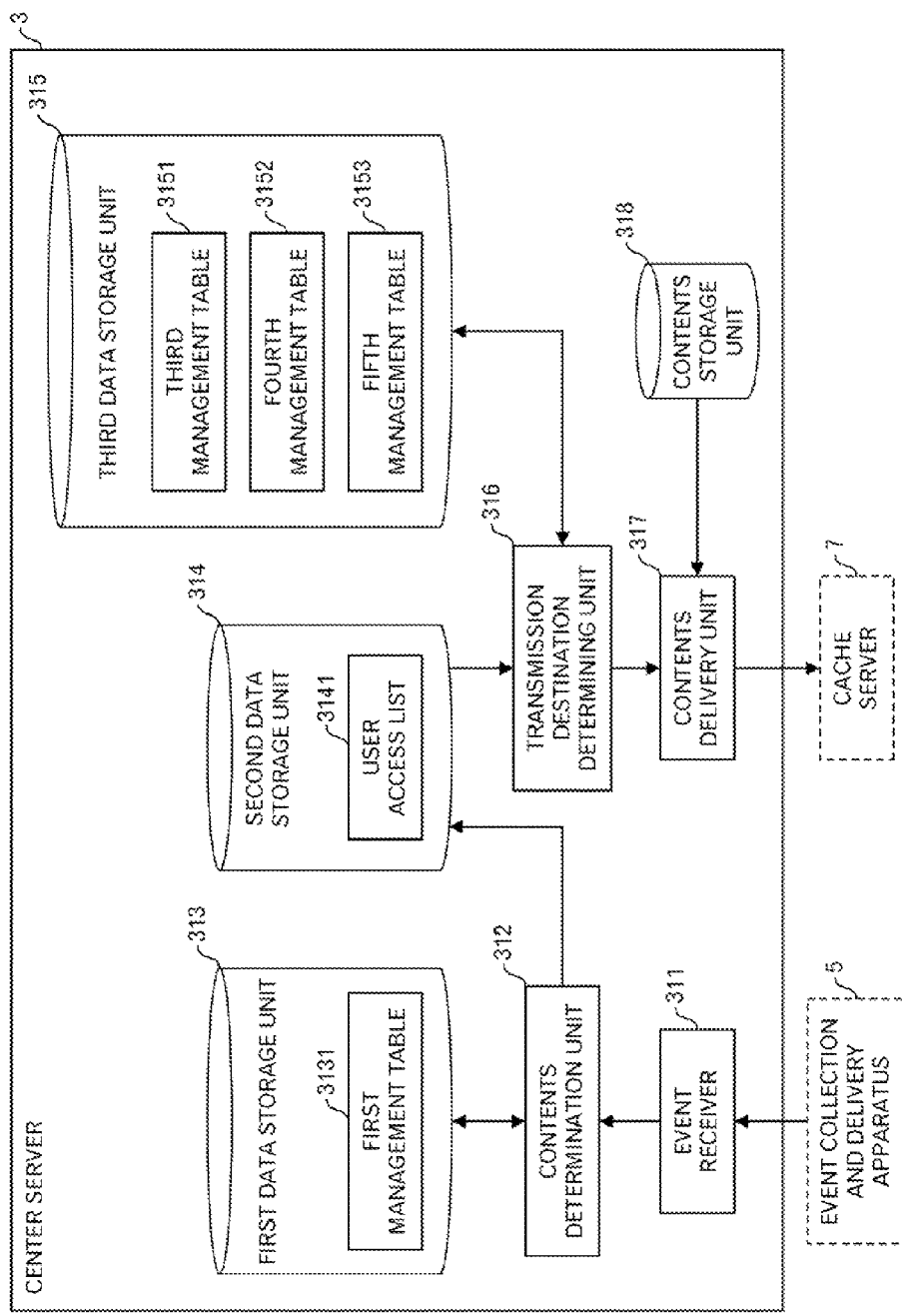

| CONTENTS ID | CONDITION | STORAGE DESTINATION | SIZE |
|---|---|---|---|
| c20 | Temp<10 | d:¥a1.mpg | 20M |
| | Temp≧10 | d:¥a2.mpg | |
| ⋮ | ⋮ | ⋮ | ⋮ |

| DISPLAY APPARATUS ID | CS ADDRESS | AVERAGE THROUGHPUT | COMMUNICATION TIME |
|---|---|---|---|
| d100 | 10.25.25.10 | 25M | 0.8 |
| d101 | 10.25.25.10 | 30M | 0.67 |
| d100 | 10.25.25.11 | 15M | 1.33 |
| d101 | 10.25.25.11 | 20M | 1.0 |
| d201 | 10.25.25.19 | 18M | 1.1 |
| d201 | 10.25.25.10 | -- | -- |
| d201 | 10.25.25.11 | -- | -- |
| d100 | 10.25.25.19 | -- | -- |
| d101 | 10.25.25.19 | -- | -- |

| CONTENTS ID | ADDRESS OF CONTENTS DEPLOYMENT DESTINATION DETERMINATION SERVER |
|---|---|
| c1** | 10.25.100.111 |
| c2** | 10.25.100.112 |
| ⋮ | ⋮ |

# DISTRIBUTED CACHE SYSTEM FOR DELIVERING CONTENTS TO DISPLAY APPARATUS

CROSS-REFERENCE TO RELATED APPLICATIONS

This application is based upon and claims the benefit of priority of the prior Japanese Patent Application No. 2012-044716, filed on Feb. 29, 2012, the entire contents of which are incorporated herein by reference.

FIELD

This technique relates to a technique for caching data in a distributed manner.

BACKGROUND

With reduced costs of broadband networks in recent years, many data distribution systems have been created, in which large displays are installed in stores throughout the city and/or in vending machines, and high-resolution videos such as information or advertisements for a particular area are distributed from a center server. These distribution systems include systems that distribute predetermined contents to display apparatuses at preset times, and systems in which display apparatuses acquire contents from a center server periodically or in response to an acquisition instruction from a user as a trigger.

Particularly, in the latter case, information that matches the tastes and interests of the user viewing the information can be displayed, so such systems are expected to increase in the future. However, there are problems in which, due to communication delays in the network between the center server and a display apparatus, there are cases where the user may leave the spot before the contents are displayed.

As one method for shortening the time until contents are displayed, there is a method of arranging a cache server near the display apparatuses, and distributing contents from that cache server. When many display apparatuses are distributed, plural cache servers are also installed, however, when there are contents in the cache server for a user that is currently at a display apparatus, it is possible to shorten the time necessary for displaying the contents. However, when there are no contents in a cache server for the user, the cache server acquires contents from the center server. Therefore, it still takes time.

The following technique has been proposed for solving this kind of problem concerning a time required for the display. That is, the center server obtains an event that represents that a user has come closer to a display apparatus from an entrance and exit system of a building and the like, and distributes contents beforehand for that user to a cache server near the display apparatus, in response to that event as a trigger. As a result, when the user causes the display apparatus to read the user ID by holding up an IC card or the like in front of the display apparatus, the contents can be displayed right away.

However, in this technique, an event from the entrance and exit system is directly transmitted to the center server, so as the number of users using the system increases, events become concentrated at the center server, and sometimes the processing speed of the center server decreases. Moreover, there is a limit to a capacity of the cache server, so preferably caching of contents that wastes resources in the cache servers is avoided.

Namely, there is no technique for improving the efficiency of a system that outputs contents data, which matches each user, at plural display apparatuses.

SUMMARY

A system relating to a first aspect of this technique includes: (A) a first information processing apparatus having data of a plurality of contents; (B) a plurality of display apparatuses, each including a function to read an identifier of a user; (C) a plurality of second information processing apparatuses, each of which obtains and stores portion of data of the plurality of contents from the first information processing apparatus, and outputs stored data to at least one of the plurality of display apparatuses; and (D) a third information processing apparatus that detects a predetermined event. The third information processing apparatus includes a first data storage unit storing first correlation data to correlate an identifier of a user with at least one second information processing apparatus of the plurality of second information processing apparatuses. When detecting the predetermined event, the third information processing apparatus identifies a second information processing apparatus correlated with an identifier of a user, which is included in data of the detected predetermined event, from the first data storage unit, and transmits the identifier of the user, which is included in the detected predetermined event, to the identified second information processing apparatus. At least one second information processing apparatus of the plurality of second information processing apparatuses identifies data of contents to be outputted to the at least one of the plurality of display apparatuses based on the identifier of the user, which is transmitted from the third in format ion processing apparatus. The at least one second information processing apparatus obtains and stores the identified data from the first information processing apparatus. When receiving the identifier of the user from the at least one of the plurality of display apparatuses, the at least one second information processing apparatus outputs data of contents corresponding to the identifier of the user to the at least one of the plurality of display apparatuses.

A system relating to a second aspect of this technique includes: (A) a first information processing apparatus having a first data storage unit storing data of a plurality of contents; (B) a plurality of display apparatuses, each including a function to read an identifier of a user; (C) a plurality of second information processing apparatuses, each of which obtains from the first information processing apparatus and caches data of contents to be outputted to at least one display apparatus of the plurality of display apparatuses, and outputs corresponding data of contents in response to a request including an identifier of a user from the at least one display apparatus; and (D) a third information processing apparatus that transmits data including an identifier of a user to the first information processing apparatus, upon detecting a predetermined event including the identifier of the user. Then, the first information processing apparatus comprises a second data storage unit storing first correlation data to correlate an identifier of a user with an identifier of contents, second correlation data to correlate an identifier of a display apparatus with an identifier of a user, and third correlation data to correlate an identifier of a display apparatus with one or plural identifiers of one or plural second information processing apparatuses. When receiving the data including the identifier of the user from the third information processing apparatus, the first information processing apparatus identifies an identifier of contents, which is correlated with the identifier of the user, which is included in the received data, from the first correlation data, and stores data to correlate the identifier of the user, which is included in the received data, with the identified identifier of the contents in a third data storage unit. When the third data storage unit stores data to correlate a same identifier of contents with plural identifiers of plural users, the first information processing apparatus identifies an identifier of a display apparatus, which is correlated with each of the plural identifiers of the plural users, from the second correlation data, and extracts from the third correlation data, an identifier of a second information processing apparatus, which is correlated with the identified identifier of the display apparatus. When a same identifier of a second information processing apparatus is extracted, for at least two identifiers of at least two users among the plural identifiers of the plural users, the first information processing apparatus reads from the first data storage unit and transmits data of the contents, for which the same identifier is identified, to the second information processing apparatus for which the same identifier is extracted or transmits the same identifier of the contents to the second information processing apparatus for which the same identifier is extracted.

A system relating to a third aspect of this technique includes: (A) a first information processing apparatus having a first data storage unit storing data of a plurality of contents; (B) a plurality of display apparatuses, each including a function to read an identifier of a user; (C) a plurality of second information processing apparatuses, each of which identifies data of contents to be outputted to at least one display apparatus of the plurality of display apparatuses based on an identifier of a user, and obtains and caches the identified data of the contents from the first information processing apparatus, and outputs corresponding data of contents in response to a request including an identifier of a user from the at least one display apparatus; and (D) a third information processing apparatus comprising a second data storage unit storing first correlation data to correlate an identifier of a user with an identifier of contents, second correlation data to correlate an identifier of a display apparatus with an identifier of a user, and third correlation data to correlate an identifier of a display apparatus with one or plural identifiers of one or plural second information processing apparatuses, and a third data storage unit. When detecting a predetermined event including an identifier of a user, the third information processing apparatus identifies, from the first correlation data, an identifier of contents, which is correlated with the identifier of the user, which is included in the detected predetermined event, and stores data to correlate the identified identifier of the contents with the identifier of the user, which is included in the detected predetermined event in the third data storage unit. When the third data storage unit stores data to correlate a same identifier of contents with plural identifiers of plural users, the third information processing apparatus identifies an identifier of a display apparatus, which is correlated with each of the plural identifiers of the plural users, from the second correlation data, and extracts from the third correlation data, an identifier of a second information processing apparatus, which is correlated with the identified identifier of the display apparatus. When a same identifier of a second information processing apparatus is extracted for at least two identifiers of at least two users among the plural identifiers of the plural users, the third in formation processing apparatus transmits the at least two identifiers of the at least two users or the same identifier of the contents to the second information processing apparatus for which the same identifier is extracted.

A system relating to a fourth aspect of this technique includes: (A) a first information processing apparatus having a first data storage unit storing data of a plurality of contents; (B) a plurality of display apparatuses, each including a function to read an identifier of a user; (C) a plurality of second information processing apparatuses, each of which identifies data of contents to be outputted to at least one display apparatus of the plurality of display apparatuses based on an identifier of a user or an identifier of contents, and obtains and caches the identified data of the contents from the first information processing apparatus, and outputs corresponding data of contents in response to a request including an identifier of a user from the at least one display apparatus; and (D) a plurality of third information processing apparatuses; (E) a fourth information processing apparatus comprising a second data storage unit storing first correlation data to correlate an identifier of a user with an identifier of contents and second correlation data to correlate an identifier of contents with one of the plurality of third information processing apparatuses. When detecting a predetermined event, including an identifier of a user, the fourth information processing apparatus identifies, from the first correlation data, an identifier of contents, which is correlated with the identifier of the user, which is included in the detected predetermined event, and identifies an identifier of a third information processing apparatus, which is correlated with the identified identifier of the contents, from the second correlation data, and transmits data including the identifier of the user, which is included in the detected predetermined event, and the identified identifier of the contents or data including the identifier of the user, which is included in the detected predetermined event, to the third information processing apparatus whose identifier is identified. Each of the plurality of third information processing apparatuses comprises a third data storage unit storing second correlation data to correlate an identifier of a user with an identifier of a display apparatus and third correlation data to correlate an identifier of a display apparatus with one or plural identifiers of one or plural second information processing apparatuses. Each of the plurality of third information processing apparatuses stores data to correlate the identifier of the user, which is included in the data received from the fourth information processing apparatus with the identifier of the contents, which is included in the data received from the fourth information processing apparatus in a fourth data storage unit, or identifies an identifier of contents, which corresponds to the identifier of the user, which is included in the data received from the fourth information processing apparatus to store data to correlate the identifier of the user with the identified identifier of the contents, into the fourth data storage unit. When the fourth data storage unit stores data to correlate plural identifiers of plural users with a same identifier of contents, each of the plurality of third information processing apparatuses identifies, from the second correlation data, an identifier of a display apparatus, which is correlated with each of the plural identifiers of the plural users, and extracts, from the third correlation data, an identifier of a second information processing apparatus, which is correlated with the identified identifier of the display apparatuses. When a same identifier of a second in formation processing apparatus is extracted for at least two identifiers of at least two users among the plural identifiers of the plural users, each of the plurality of third information processing apparatuses transmits the at least two identifiers of the at least two users or the same identifier of the contents to the second information processing apparatus for which the same identifier is extracted.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a diagram depicting an example of data in a first management table in the cache server;

FIG. 9 is a diagram depicting an example of data stored in a second management table in the cache server;

FIG. 11 is a diagram depicting an example of setting data relating to the first embodiment;

FIG. 16 is a functional block diagram of a center server relating to the third embodiment;

DESCRIPTION OF EMBODIMENTS

Embodiment 1

Figure 1:
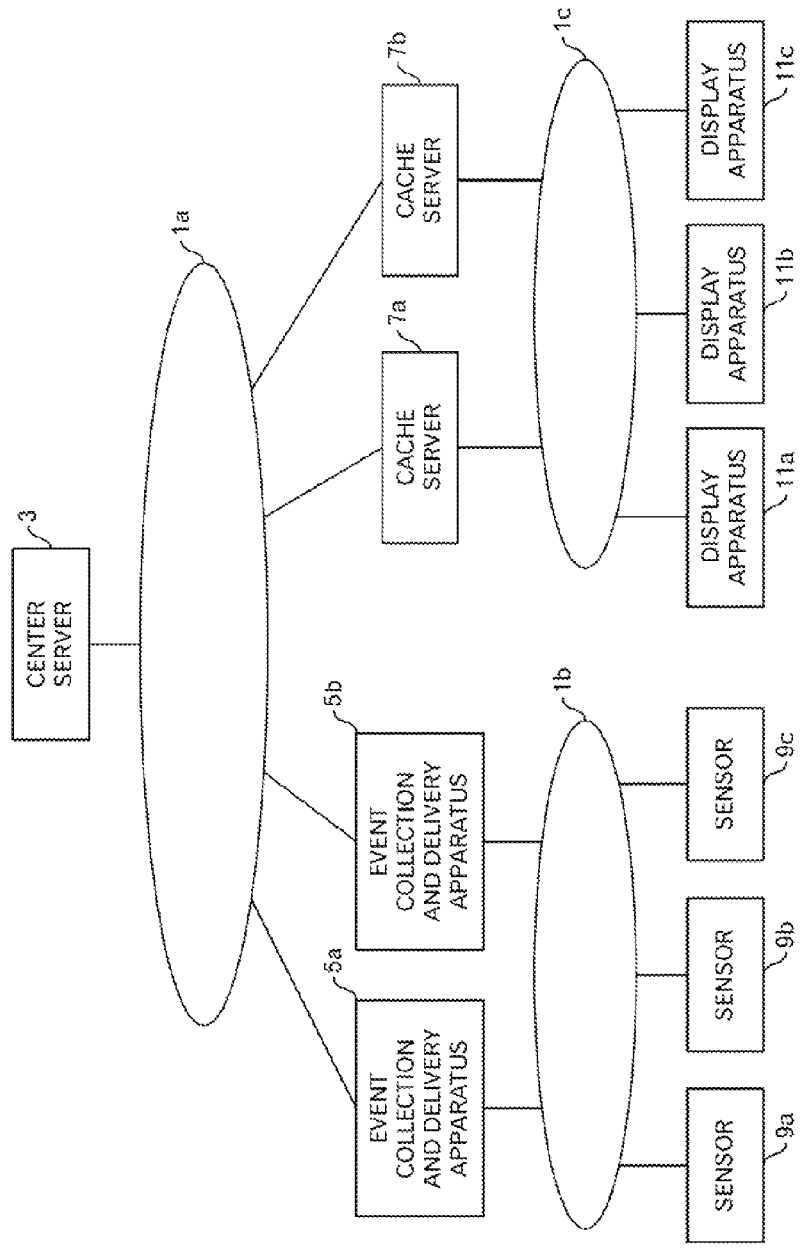
FIG. 1 is a diagram depicting an outline of a system relating to a first embodiment.

FIG. 1 illustrates a system of this embodiment. In the example illustrated in FIG. 1, a center server 3 that contains contents data that is used by the system, event collection and delivery apparatuses 5 (5a and 5b in FIG. 1) and cache servers 7 (7a and 7b in FIG. 1) are connected to a network 1a. Moreover, the event collection and delivery apparatuses 5a and 5b and plural sensors 8 (sensors 9a, 9b and 9c in FIG. 1) are connected to a network 1b. Furthermore, cache servers 7a and 7b and display apparatuses 11 (11a, 11b and 11c in FIG. 1) are connected to a network 1c.

The sensors 9a to 9c are located at the entrances and exits of a building or facility, for example. The sensors 9a to 9c may be used together with an apparatus for entrance and exit management, or may be used independently in the case where the entrance and exit management is not performed. Moreover, the display apparatuses 11a to 11c are distributedly placed inside the building or facility. Furthermore, the cache servers 7a and 7b are located at positions such that the response time for displaying contents on the display apparatuses 11a to 11c can be kept within a predetermined amount of time according to the disposition of the display apparatuses 11a to 11c.

The sensors 9a to 9c are correlated with one or more event collection and delivery apparatuses 5. The display apparatuses 11a to 11c are also correlated with one or more cache servers 7. One center server 3 is installed in one building or facility, for example.

Each of the sensors 9a to 9c reads a user ID from an IC card or the like, which is carried by the user and which stores the user ID, and transmits event data that includes that user ID to an event collection and delivery apparatus 5 that corresponds to itself. The event collection and delivery apparatus 5a carries out a processing that will be described below and transfers event data to a cache server 7. The cache server 7 receives the event data flora the event collection and delivery apparatuses 5, and when the cache server 7 does nor have contents data to be displayed by the display apparatuses 11, the cache server 7 acquires and caches contents data from the center server 3. When a user, for example, visits a display apparatus 11a and presents an IC card, a first sensor of the display apparatus 11a reads the user ID, and a second sensor, such as a temperature sensor, measures the temperature, and the display apparatus 11a transmits data that includes the user ID and temperature to its corresponding cache server 7. The cache server 7 outputs contents data that corresponds to the data received from the display apparatus 11a to the display apparatus 11a, and the display apparatus 11a displays that contents data.

Figure 2:
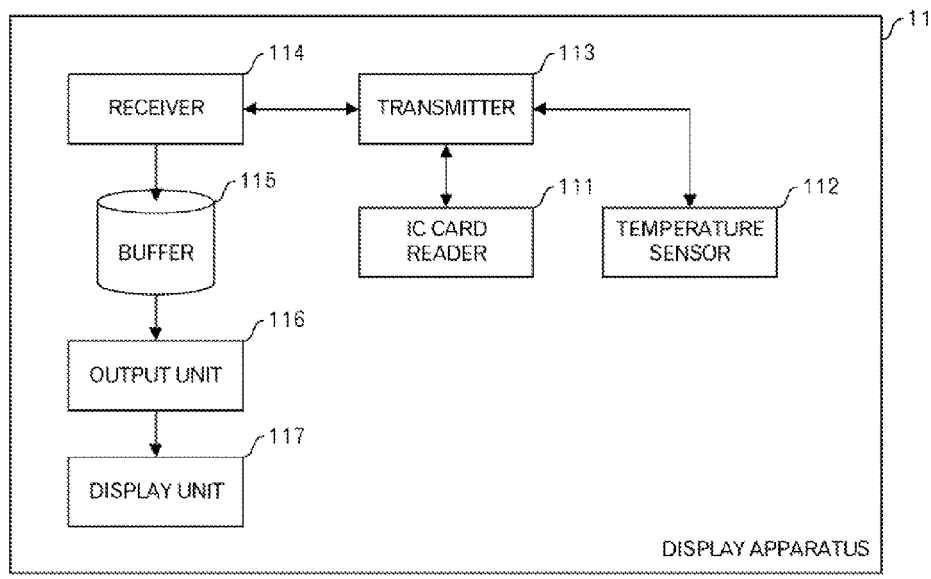
FIG. 2 is a functional block diagram of a display apparatus relating to the first embodiment.

FIG. 2 illustrates a configuration example of the display apparatus 11a. As illustrated in FIG. 2, the display apparatus, 11a has an IC card reader 111, a temperature sensor 112, a transmitter 113, a receiver 114, a buffer 115, an output unit 116 and a display unit 117. The IC card reader 111 reads a user ID from an IC card that is carried by the user, and outputs that user ID to the transmitter 113. The temperature sensor 112 outputs a measurement value of the temperature to the transmitter 113 in response to a request from the transmitter 113. The temperature sensor is a mere example, and may be another kind of sensor. For example, the sensor may be a device that takes an image of a user's face with a camera, and processes that face image to recognize his or her expression. The transmitter 113 transmits a contents request that includes the user ID and temperature to a pre-registered cache server 7. When plural cache servers 7 are registered, a priority may be set for each cache server 7, for example, and the contents request may be transmitted in order of the priority.

The receiver 114 receives contents data from the cache server 7 and stores that data in the buffer 115. The output unit 116 outputs the content data that is stored in the buffer 115 to the display unit 117. The display apparatus may be combined with an apparatus that has other functions, such as a vending machine or kiosk terminal, or may be installed as just a display apparatus.

Figure 3:
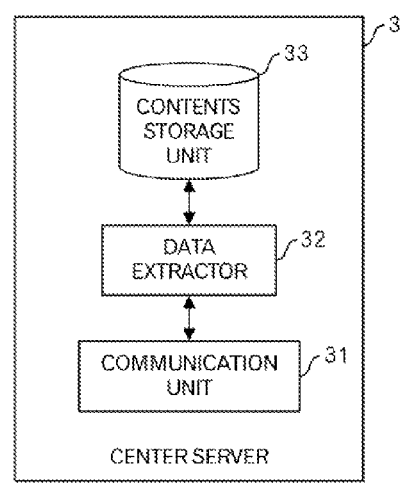
FIG. 3 is a functional block diagram of a center server relating to the first embodiment.

FIG. 3 illustrates a configuration example of the center server 3. The center server 3 has a communication unit 31 that performs communication with the cache servers 7, a data extractor 32 and a contents storage unit 33 that stores data for the contents to be displayed by the display apparatuses 11. After receiving a contents request that includes a contents ID from the cache server 7, the communication unit 31 outputs the contents ID to the data extractor 32. The data extractor 32 reads the contents data for the contents ID that was requested by the cache server 7 from the contents storage unit 33, and outputs that contents data to the communication unit 31. The communication unit 31 transmits the contents data received from the data extractor 32 to the cache server 7 that requested the data.

Figures 4, 5, 6:
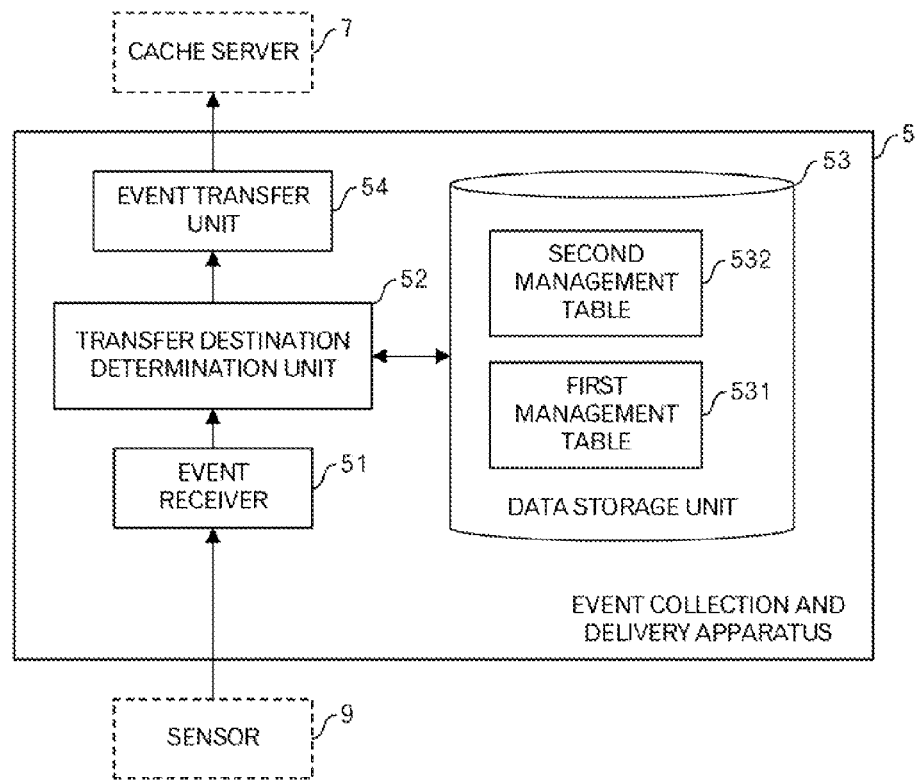
FIG. 4 is a functional block diagram of an event collection and delivery apparatus relating to the first embodiment.
FIG. 5 is a diagram depicting an example of data stored in a first management table in the event collection and delivery apparatus.
FIG. 6 is a diagram depicting an example of data stored in a second management table in the event collection and delivery apparatus.

Next, FIG. 4 illustrates a configuration example of the event collection and delivery apparatus 5. The event collection and delivery apparatus 5 has an event receiver 51, a transfer destination determination unit 52, an event transfer unit 54 and a data storage unit 53. The data storage unit 53 stores a first management table 531 and a second management table 532. The event receiver 51 receives event data that includes a user ID from a sensor 9, and outputs the event data to the transfer destination determination unit 52. The transfer destination determination unit 52 determines the address of the cache server 7 (may be abbreviated as CS) as the transfer destination of the event data, from the first management table 531 and second management table 532 that are stored in the data storage unit 53, and outputs that address together with the event data to the event transfer unit 54. The event transfer unit 54 transmits the event data to the determined cache server 7.

The event data not only includes a user ID, but also, for example, includes the type of an event (entrance, exit or the like), the time when the event occurred, the sensor ID and the like.

The first management table 531 stores data such as illustrated in FIG. 5. In the example in FIG. 5, one or plural display apparatus IDs are registered in association with the user ID. In this way, the display apparatus that a user often uses is identified in advance, and the display apparatus ID of that display apparatus is registered in association with the user ID in advance.

The second management table 532 stores data such as illustrated in FIG. 6. In the example in FIG. 6, the address (CS address) of the cache server 7 is registered in association with the display apparatus ID. In this way, the correlations between the display apparatus 11 and the corresponding cache server 7, which is in charge of that display apparatus 11, are registered.

Figure 7:
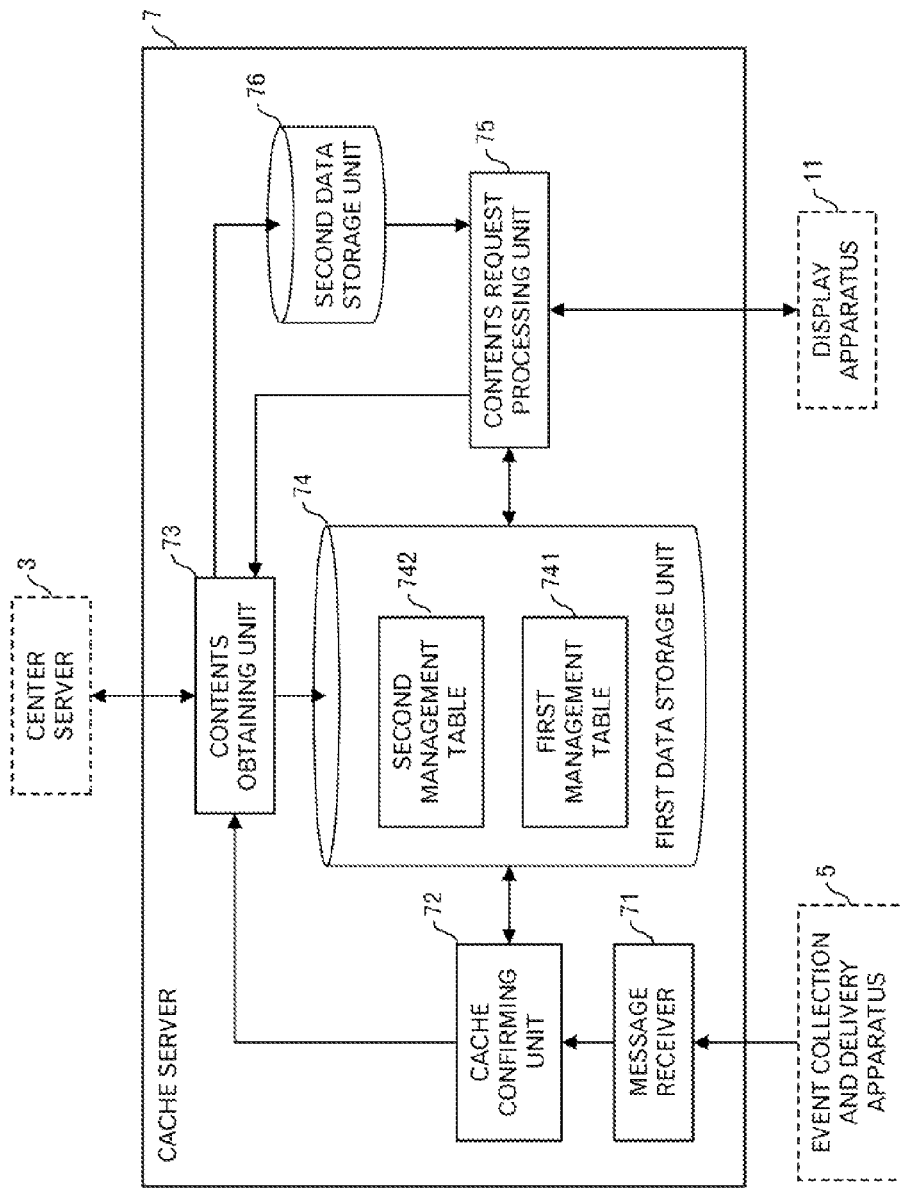
FIG. 7 is a functional block diagram of a cache server relating to the first embodiment.

FIG. 7 illustrates a configuration example of the cache server 7. The cache server 7 has a message receiver 71, a cache confirming unit 72, a contents obtaining unit 73, a first data storage unit 74, a contents request processing unit 75, and a second data storage unit 76. The first data storage unit 74 stores a first management table 741 and a second management table 742.

The message receiver 71 receives event data from an event collection and delivery apparatus 5, and outputs the event data to the cache confirming unit 72. The cache confirming unit 72 determines, from the data stored in the first data storage unit 74, whether or not contents data that is to be outputted to the display apparatus 11 is already stored in the second data storage unit 76. When the contents data that is to be outputted to the display apparatus 11 is already stored in the second data storage unit 76, the processing ends here. On the other hand, when the contents data that is to be outputted to the display apparatus 11 is not stored in the second data storage unit 76, the cache confirming unit 72 outputs the contents ID to the contents obtaining unit 73. After receiving the contents ID from the cache confirming unit 72, the contents obtaining unit 73 transmits a contents request that includes that contents ID to the center server 3, and after receiving the contents data from the center server 3, the contents obtaining unit 73 stores the contents data in the second data storage unit 76 and updates the data that is stored in the first data storage unit 74.

Moreover, when receiving a contents request from a display apparatus 11, the contents request processing unit 75 identifies the contents to be outputted, based on the data that is stored in the first data storage unit 74, and when that contents data is stored in the second data storage unit 76, the contents request processing unit 75 reads that contents data from the second data storage unit 76, and outputs that contents data to the display apparatus 11. On the other hand, when the contents data that is to be outputted is not stored in the second data storage unit 76, the contents request processing unit 75 outputs the contents ID to the contents obtaining unit 73, and causes the contents obtaining unit 73 to obtain the contents data having that contents ID.

FIG. 8 illustrates an example of data that is stored in the first management table 741. In the example in FIG. 8, the contents ID of contents suitable for a user is registered in association with the user ID of that user.

FIG. 9 illustrates an example of data that is stored in the second management table 742. In the example in FIG. 9, one or plural output conditions, the storage destination of actual contents data for each output condition, the user ID of a user who lastly used the actual contents data, and the last utilization date are registered in association with the contents ID. For example, when the contents ID of the contents to be outputted is identified to be "c20", and the temperature is 15 degrees, "a2.mpg" is outputted to the display apparatus.

Figure 10:
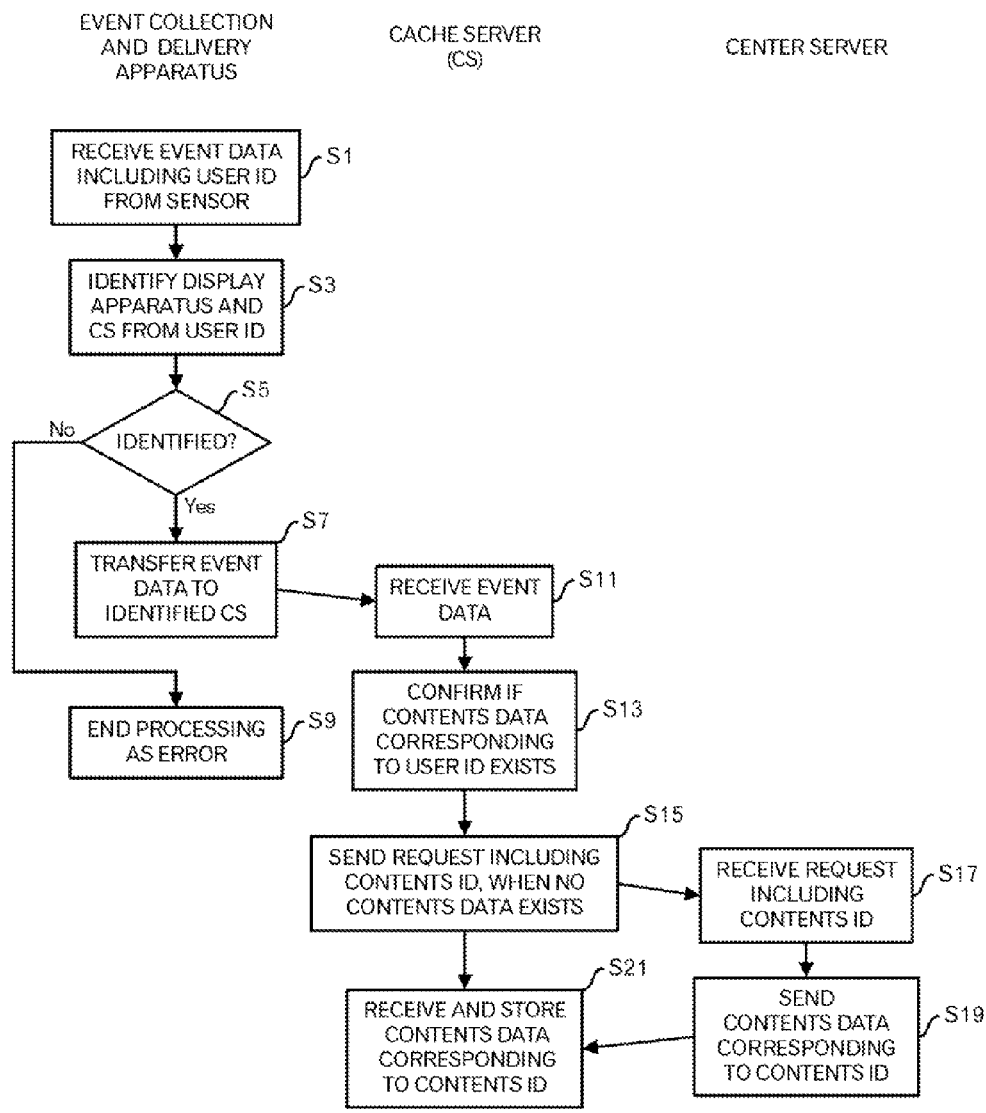
FIG. 10 is a diagram depicting a processing flow relating to the first embodiment.

The processing contents of the system will be explained in detail using FIG. 10 to FIG. 12. When the event receiver 51 of the event collection and delivery apparatus 5 receives event data (for example, entrance event) that includes a user ID from a sensor 9 at the entrance (FIG. 10: step S1), for example, the event receiver 51 outputs that event data to the transfer destination determination unit 52. When receiving the event data, the transfer destination determination unit 52 searches the first management table 531 using the user ID that is included in the event data to identify the correlated display apparatus ID, and also searches the second management table 532 with this display apparatus ID to identify the address (CS address) of the correlated cache server 7 (step S3).

In this embodiment, it is presumed that display apparatus ID that corresponds to the user ID is registered in advance in the first management table 531, however, there may be cases in which registration is not in time. In that case, the user ID that is included in the event data is not found in the first management table 531, so it is not possible to identify the address of the cache server 7. However, for cases such as this, setting data such as illustrated in FIG. 11 may be stored in the data storage unit 53, and the processing may be carried out according to that setting data. In the example in FIG. 11, "All" or "(0) Zero" is registered according to an error processing flag. In other words, in the case of "All", all of the cache servers 7 that are registered in the second management table 532, for example, are set as the transfer destination. Moreover, in the case of "0", it means that it was not possible to identify any cache server 7.

When it was not possible to identify an address of the cache server 7 (step S5: NO route), the processing ends as an error (step S9).

On the other hand, when it is possible to identify the address of the cache server 7, the transfer destination determination unit 52 outputs the address of the identified cache server 7 and the event data to the event transfer unit 54.

The event transfer unit 54 transfers the event data that includes the user ID (for example, event data of an entrance event) to the identified cache server 7 (step S7).

The message receiver 71 of the cache server 7 receives the event data (event data of an entrance event) from the event collection and delivery apparatus 5 (step S11), and outputs that event data to the cache confirming unit 72.

The cache confirming unit 72 searches the first management table 741 that is stored in the first data storage unit 74 by using the user ID that is included in the event data to identify the correlated contents ID, and further searches the second management table 742 by using that contents ID to determine whether or not an entry for that contents ID is registered in the second management table 742, or in other words, determine whether or not contents data is stored in the second data storage unit 76 (step S13). Similar to the case described above, the registration of the user ID in the first management table 741 may be delayed. In such a case, the contents ID cannot be identified, so the processing ends here. Moreover, when the identified contents ID has been registered in the second management table 742, the processing ends here. In the second management table 742, the user ID of the user who lastly used the contents, which is associated with the identified contents ID, may be updated with the user ID that is included in the received event data, and the date of the last utilization, which is also correlated with the identified contents ID, may be updated with the current time.

On the other hand, when the identified contents ID has not been registered in the second management table 742, the cache confirming unit 72 outputs the contents ID and user ID to the contents obtaining unit 73, and the contents obtaining unit 73 transmits a contents request that includes the contents ID to the center server 3 (step S15).

The communication unit 31 of the center server 3 receives the contents request that includes the contents ID (step S17) and outputs the contents ID to the data extractor 32, then the data extractor 32 reads the contents data for the received contents ID from the contents storage unit 33, and outputs that contents data to the communication unit 31. The communication unit 31 then transmits the contents data that corresponds to the contents ID to the cache server 7 (step S19). The contents data includes data about the output conditions, and contents data that corresponds to each of the output conditions.

When receiving the contents data from the center server 3, the contents obtaining unit 73 of the cache server 7 stores the contents data in the second data storage unit 76, as wall as registers the data of the output conditions and data concerning the storage destination of the contents data in the second management table 742 of the first data storage unit 74 in association with the contents ID of that contents (step S21).

In the second management table 742, the user ID of the user who lastly used, which is associated with the contents ID, may be updated with the user ID included in the received event data, and the date of the last utilization, which is correlated with the contents ID, may be updated with the current date.

The processing described above is a processing that is carried out when the user's IC card is read at the entrance by the sensor 9, and before the user goes to one of the display apparatuses 11.

Next, a processing that is carried out when the user goes to an area where the display apparatus 11 is installed, and has the IC card read by the IC card reader 111 will be explained using FIG. 12.

Figure 12:
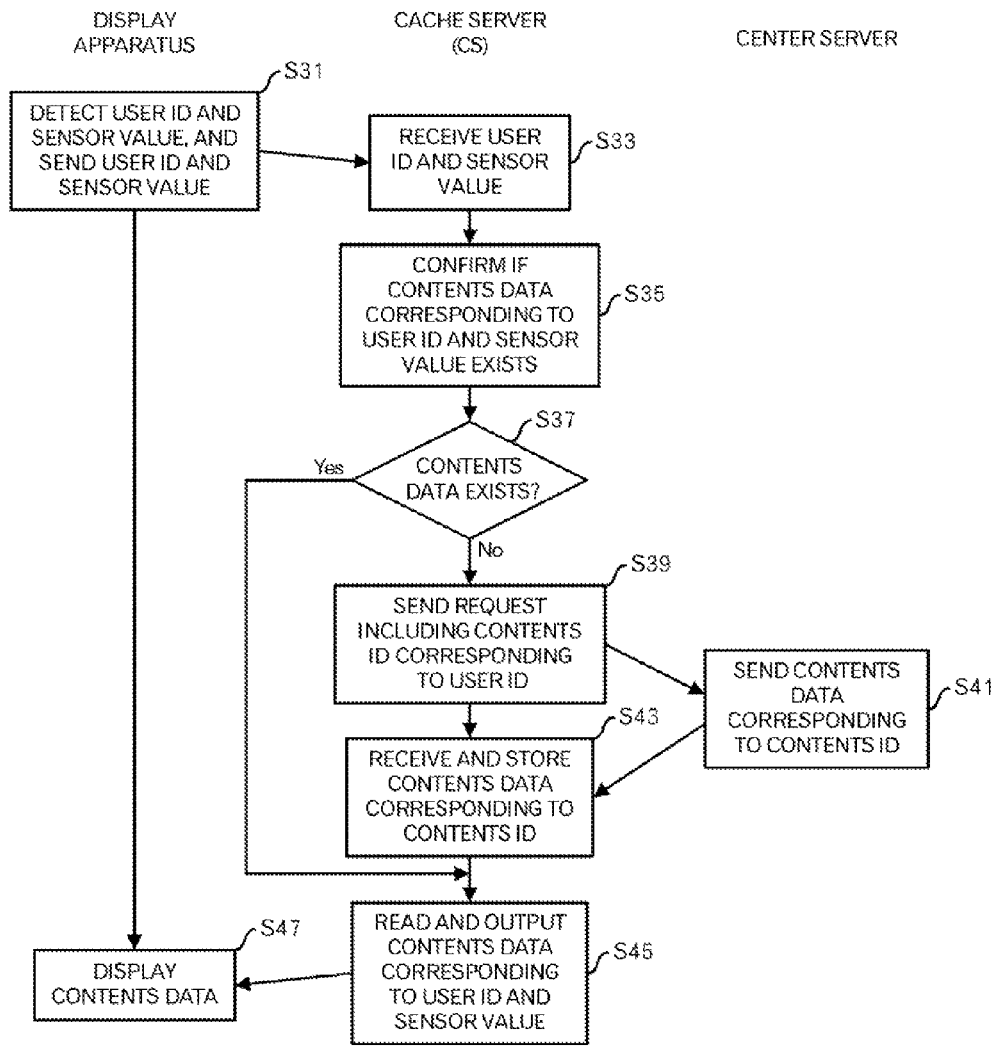
FIG. 12 is a diagram depicting a processing flow relating to the first embodiment.

When the IC card reader 111 of the display apparatus 11 reads the user ID from the IC card, and a temperature sensor 112 measures the temperature, the transmitter 113 transmits a contents request that includes the user ID and temperature (generally, the sensor value) to the cache server 7 (FIG. 12: step S31). When the contents request processing unit 75 of the cache server 7 receives the contents request that includes the user ID and temperature from the display apparatus 11 (step S33), contents request processing unit 75 searches the first management table 741 using the user ID that is included in the contents request to read the contents ID, then searches the second management table 742 using the contents ID and the temperature, which are included in the contents request, to determine whether or not corresponding contents data is stored in the second data storage unit 76 (step S35). For example, when the temperature is 15 degrees, the contents request processing unit 75 searches the second management table 742 using the identified contents ID and the condition of the temperature of 15 degrees, to determine whether or not the storage destination of the contents data is registered.

When the user ID is not registered in the first management table 741, the contents request processing unit 75 transmits an error notification to the display apparatus 11, and the display apparatus 11, for example, outputs general contents.

When the corresponding contents data is stored in the second data storage unit 76 (step S37: YES route), the processing moves to step S45. On the other hand, when the corresponding contents data is not stored in the second data storage unit 76 (step S37: NO route), the contents request processing unit 75 outputs the contents ID and user ID to the contents obtaining unit 73. As a result, the contents request processing unit 75 transmits a contents request that includes the contents ID that corresponds to the user ID to the center server 3 (step S39).

The communication unit 31 of the center server 3 receives the contents request that includes the contents ID and outputs the contents ID to the data extractor 32, the data extractor 32 then reads the contents data of the received contents ID from the contents storage unit 33, and outputs that contents data to the communication unit 31. The communication unit 31 then transmits the contents data that corresponds to the contents ID to the cache server 7 (step S41). The contents data includes data about the output conditions, and contents data that corresponds to each of the output conditions.

When the contents obtaining unit 73 of the cache server 7 receives the contents data from the center server 3, the contents obtaining unit 73 then stores the contents data in the second data storage unit 76, and registers the data regarding the output conditions and data regarding the storage destination of the contents data in association with the contents ID of that contents data in the second management table 742 of the first data storage unit 74 (step S43). The processing then moves to the step S45.

In the second management table 742, the user ID of the user who lastly used, which is correlated with the contents ID, may be updated with the user ID that is included in the received event data, and the time of the last utilization, which is correlated with the contents ID, may be updated with the current date and time.

After that, the contents request processing unit 75 of the cache server 7 reads contents data that corresponds to the user ID and the temperature from the second data storage unit 76, and outputs that contents data to the display apparatus 11 that is the request source (step S45).

The receiver 114 of the display apparatus 11 receives the contents data from the cache server 7 and stores the contents data in the buffer 115. The output unit 116 outputs the contents data that is stored in the buffer 115 to the display unit 117 (step S47).

By performing the processing described above, it is possible to output contents data to the display apparatus 11 that is suitable for the user without directly transmitting plural event data to the center server 3 and causing the center server 3 to carry out the processing. In other words, the processing is carried out in a distributed manner among the cache servers 7 that are distributed such that there is no slow response from the center server 3. Then, also in the overall system, the processing can be performed efficiently.

Embodiment 2

In the first embodiment as well, garbage collection in the second data storage unit 76 of the cache server 7 is carried out by a typical algorithm. However, for example, after contents data for a specific user has been stored in the second data storage unit 76 of the cache server 7, when that specific user exits, there are cases in which the contents data for that specific user may not be used for other general users. In such a case, the capacity of the second data storage unit 76 is wastefully used, so in this embodiment, the capacity of the second data storage unit 76 of the cache server 7 becomes effectively used in such cases.

Figure 13:
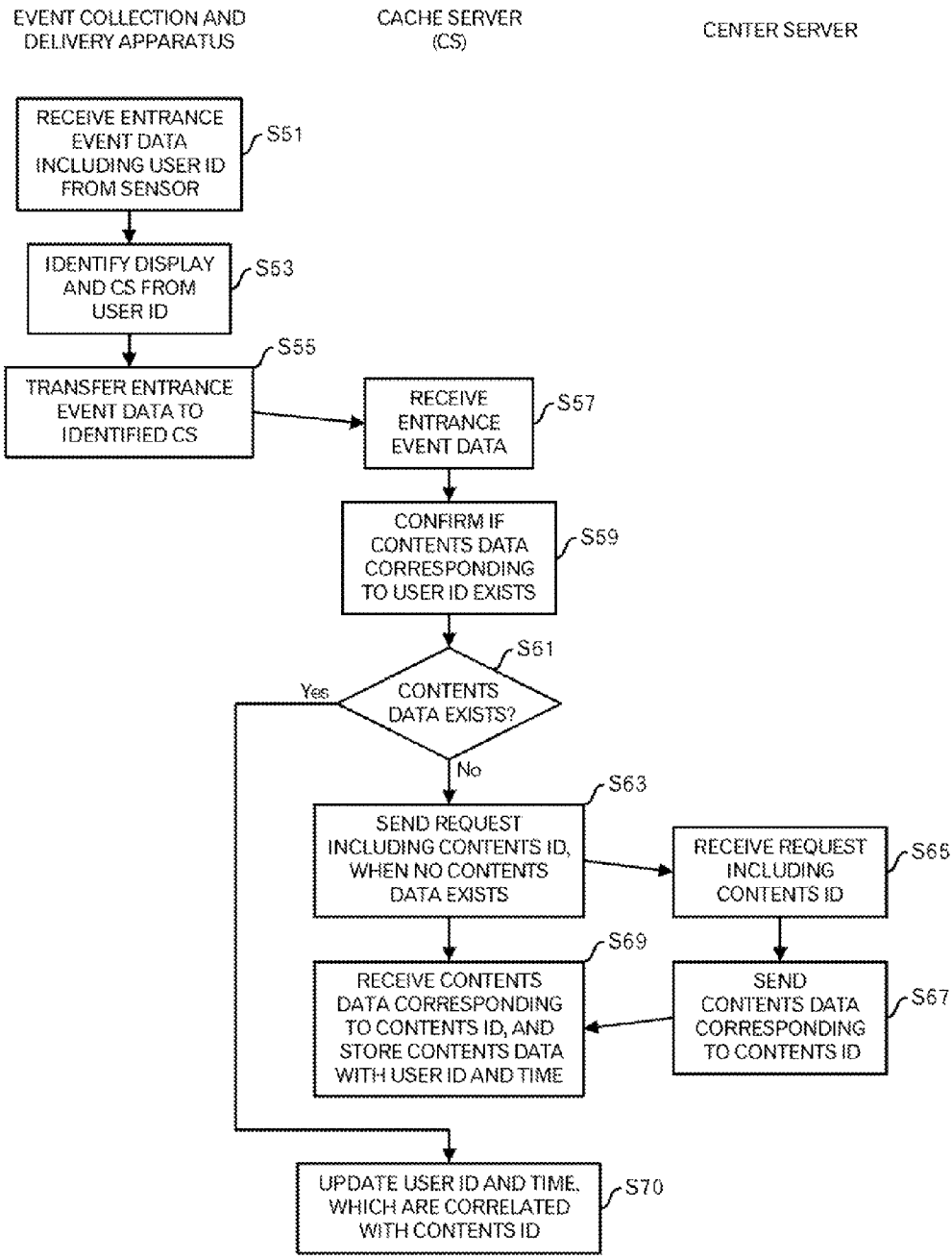
FIG. 13 is a diagram depicting a processing flow relating to a second embodiment.

The system configuration of this embodiment is the same as the system configuration of the first embodiment, and only the portion of the processing contents described below is different. Therefore, an explanation of the system configuration is omitted, and only the portion of the processing contents that is different will be explained using FIG. 13 and FIG. 14.

When the event receiver 51 of the event collection and delivery apparatus 5 receives entrance event data that includes a user ID from a sensor 9 at an entrance, for example (FIG. 13: step S51), the event receiver 51 outputs that entrance event data to the transfer destination determination unit 52. When the "transfer" destination determination unit 52 receives the entrance event data, the transfer destination determination unit 52 searches the first management table 531 by using the user ID that is included in that entrance event data to identify a correlated display apparatus ID, then searches the second management table 532 by using that display apparatus ID to identify the address (CS address) of the correlated cache server 7 (step S53).

The processing in the case when the user ID is not registered in the first management table 531 is the same as in the first embodiment, and an explanation will be omitted here.

The transfer destination determination unit 52 then outputs the address of the identified cache server 7 and the entrance event data to the event transfer unit 54.

The event transfer unit 54 transfers the entrance event data that includes the user 10 to the identified cache server 7 (step S55).

When the message receiver 71 of the cache server 7 receives the entrance event data from the event collection and delivery apparatus 5 (step S57), the message receiver 71 outputs that entrance event data to the cache confirming unit 72.

The cache confirming unit 72 searches the first management table 741 that is stored in the first data storage unit 74 by using the user ID that is included in the entrance event data to identify a correlated contents ID, and then searches the second management table 742 by using that contents ID to determine whether or not an entry for that contents ID is registered in the second management table 742, or in other words, whether or not contents data is stored in the second data storage unit 76 (step S59). There is also a case where the user ID is not registered in the first management table 741, however, the processing in that case is the same as in the first embodiment, so an explanation is omitted here. Moreover, in the case where an entry for the contents ID is registered in the second management table 742 (step S61: YES route), the cache confirming unit 72 updates, in the second management table 742, the user ID of the user who used lastly, which is correlated with the contents ID with the user ID that is included in the received entrance event data, and updates the date and time of the last utilization with the current date and time (step S70).

On the other hand, when an entry for the contents ID is not registered in the second management table 742 (step S61: NO route), the cache confirming unit 72 outputs the contents ID and user ID to the contents obtaining unit 73, and the contents obtaining unit 73 transmits a contents request that includes the contents ID to the center server 3 (step S63).

The communication unit 31 of the center server 3 receives the contents request that includes the contents ID (step S65), and outputs the contents ID to the data extractor 32, then the data extractor 32 reads the contents data of the received contents ID from the contents storage unit 33, and outputs the contents data to the communication unit 31. The communication unit 31 then transmits the contents data that corresponds to the contents ID to the cache server 7 (step S67). The contents data includes data about the output conditions, and contents data that corresponds to each of the output conditions.

When the contents obtaining unit 73 of the cache server 7 receives the contents data from the center server 3, the contents obtaining unit 73 stores the contents data in the second data storage unit 76, registers, in the second management table 742 of the first data storage unit 74, the data regarding the output conditions, data regarding the storage destination of the contents data, the user ID that is included in the entrance event data and the current date and time in association with the contents ID of the contents data (step S69).

The processing described above is a processing that is carried out after the user has the IC card read by the sensor 9 at the entrance, and before he or she goes to any one of the display apparatuses 11.

Next, the processing that is carried out when the user exits from the exit of the building or the like will be explained using FIG. 14.

When the event receiver 51 of the event collection and delivery apparatus 5 receives exit event data that includes a user ID from the sensor 9 at the exit, for example (FIG. 14: step S71), the event receiver 51 outputs that exit event data to the transfer destination determination unit 52. When the transfer destination determination unit 52 receives the exit event data, the transfer destination determination unit 52 searches the first management table 531 by using the user ID that is included in the exit event data to identify a correlated display apparatus ID, and then searches the second management table 532 by using that display apparatus ID to identify the address (CS address) of a correlated cache server 7 (step S73).

The processing that is carried out when the user ID is not registered in the first management table 531 is the same as in the first embodiment, so an explanation is omitted here.

The transfer destination determination unit 52 then outputs the address of the identified cache server 7 and the exit event data to the event transfer unit 54.

The event transfer unit 54 transfers the exit event data that includes the user ID to the identified cache server 7 (step S75).

When the message receiver 71 of the cache server 7 receives the exit event data from the event collection and delivery apparatus 5 (step S77), the message receiver 71 outputs that exit event data to the cache confirming unit 72.

The cache confirming unit 72 searches the first management table 741 that is stored in the first data storage unit 74 by using the user ID that is included in the exit event data to identify the correlated contents ID (step S79). Then, the cache confirming unit 72 searches the second management table 742 by using the identified contents ID to identify a corresponding entry. When there is no corresponding entry, the processing ends here. However, when there is a corresponding entry, the cache confirming unit 72 determines whether or not the user ID of the user who lastly used in that entry coincides with the user ID that is included in the exit event data (step S81).

Here, when the user ID of the user who lastly used in that entry does not coincide with the user ID that is included in the exit event data, the processing ends here.

On the other hand, when the user ID of the user who lastly used in that entry coincides with the user ID that is included in the exit event data, the cache confirming unit 72 deletes that entry from the second management table 742, and deletes the contents data at the storage destination included in that entry from the second data storage unit 76 (step S83). This processing may be carried out by the contents obtaining unit 73.

When a second user who is correlated with contents data that is the same as the contents data, which was stored in the cache server 7 when a first user entered, enters the building or the like, the user ID of the user who lastly used in the entry for the contents data is replaced with the user ID of the second user in the second management table 742. Therefore, the contents data is not deleted at the step S83. However, when another user that is correlated with the same contents data does not enter between the times that the first user enters and exits, it is not efficient in the capacity to maintain this contents data. Therefore, by deleting the contents data with this processing, the second data storage unit 76 is effectively utilized.

Embodiment 3

In the first and second embodiments, the problem in which the event data becomes concentrated at the center server 3 was handled, however, this embodiment includes a configuration example for improving the utilization efficiency of the capacity in the cache server 7.

In this embodiment as well, the overall system is the same as that of the first embodiment explained using FIG. 1. Moreover, the configuration of the display apparatus 11 is also the same as that in the first embodiment.

Figures 15, 18, 19:
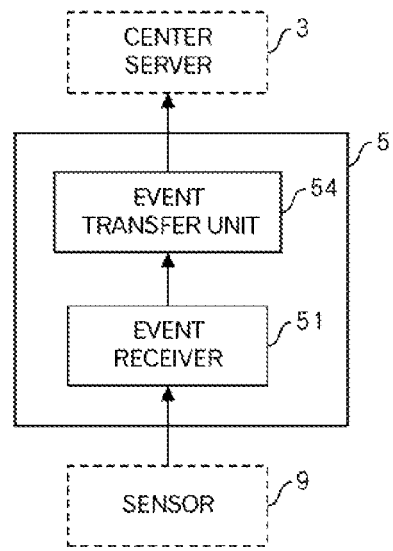
FIG. 15 is a functional block diagram of an event collection and delivery apparatus relating to a third embodiment.
FIG. 18 is a diagram depicting an example of data stored in a user access list in the center server.
FIG. 19 is a diagram depicting an example of data stored in a third management table in the center server.

FIG. 15 illustrates a configuration example of an event collection and delivery apparatus 5. As illustrated in FIG. 15, the event collection and delivery apparatus 5 of this embodiment has an event receiver 51 and an event transfer unit 54. In other words, when the event receiver 51 receives event data from a sensor 3, the event receiver 51 outputs that event data to the event transfer unit 54, then the event transfer unit 54 transmits that event data to the center server 3.

Next, FIG. 16 illustrates a configuration example of a center server 3 in this embodiment. The center sever 3 has an event receiver 311, a contents determination unit 312, a first data storage unit 313, a second data storage unit 314, a third data storage unit 315, a transmission destination determining unit 316, a contents storage unit 318, and a contents delivery unit 317. The first data storage unit 313 stores a first management table 3131. The second data storage unit 314 stores a user access list 3141. The third data storage unit 315 stores a third management table 3151, a fourth management table 3152 and a fifth management table 3153. The contents storage unit 318 stores contents data that is to be delivered to the display apparatuses 11 included in the system.

Figures 14, 17:
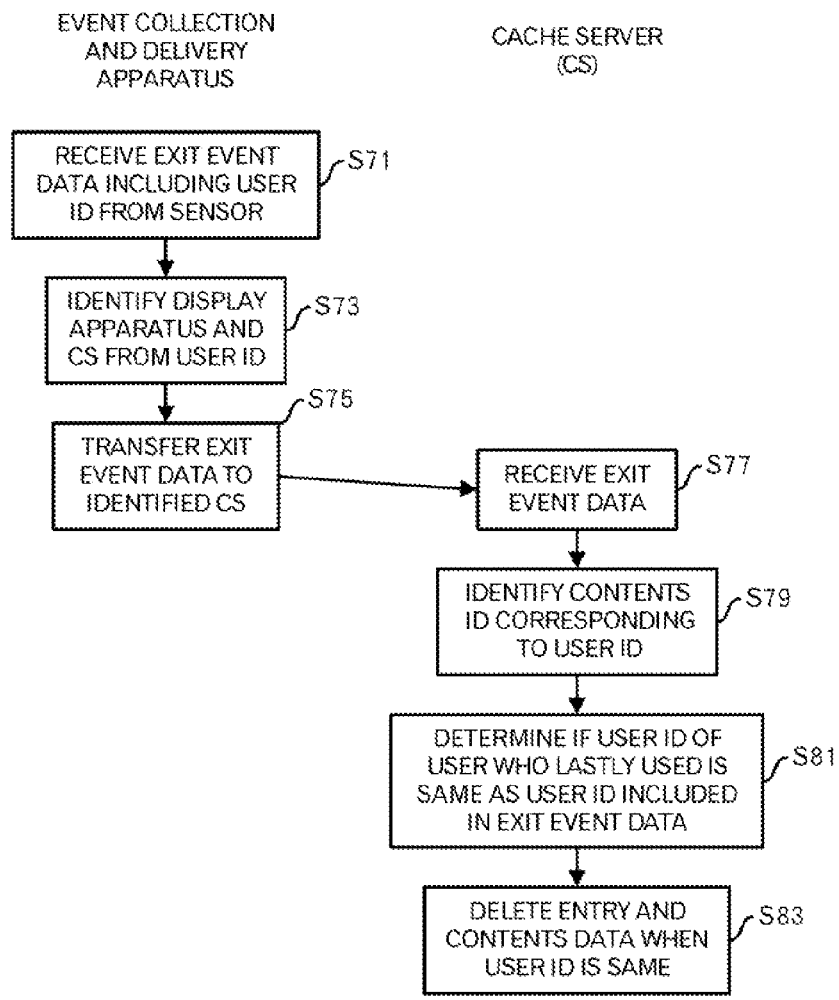
FIG. 14 is a diagram depicting a processing flow relating to the second embodiment.
FIG. 17 is a diagram depicting an example of data stored in a first management table in the center server.

FIG. 17 illustrates an example of data that is stored in the first management table 3131. In the example in FIG. 17, a contents ID of contents suitable for a user of a user ID is registered in association with that user ID.

FIG. 18 illustrates an example of data that is stored in the user access list 3141. In the example in FIG. 18, pairs of the contents ID and user ID are stored. An entry in the user access list 3141 is registered by the contents determination unit 312, and fetched by the transmission destination determining unit 316.

FIG. 19 illustrates an example of data that is stored in the third management table 3151. In the example in FIG. 19, the display apparatus IDs of one or more display apparatuses that are often used by a user are registered in association with the user ID of that user.

Figures 20, 22:
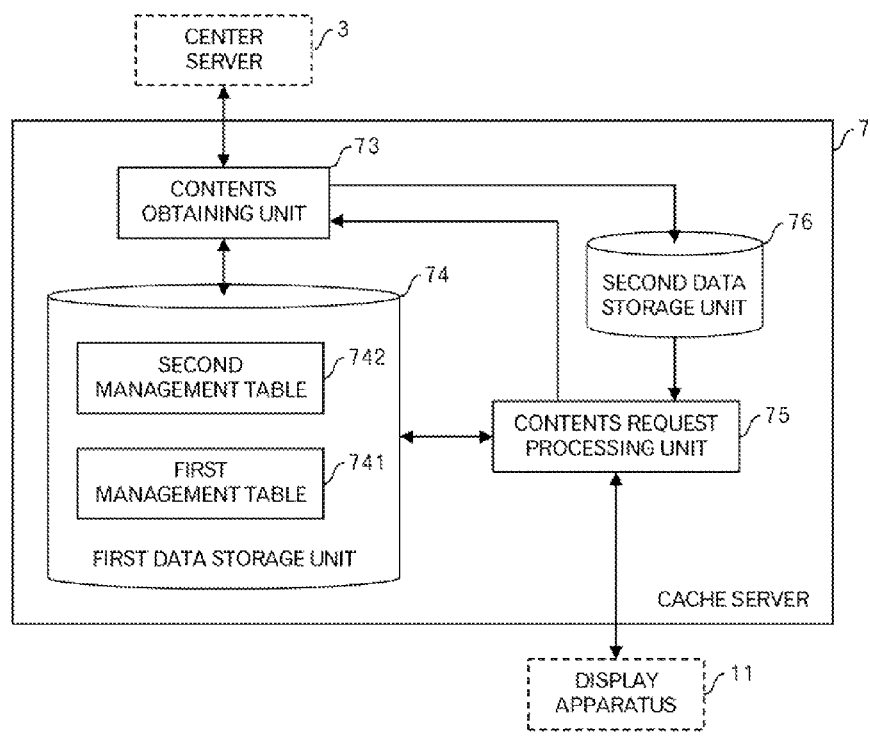
FIG. 20 is a diagram depicting an example of data stored in a fourth management table in the center server.
FIG. 22 is a functional block diagram of a cache server relating to the third embodiment.

FIG. 20 illustrates an example of data that is stored in the fourth management table 3152. In the example in FIG. 20, the address (CS address) of a cache server 7 that is accessed by a display apparatus 11 having a display apparatus ID, and the average throughput (for example, hits per second) between that display apparatus 11 and the cache server 7 are registered in association with the display apparatus ID. In this example, the display apparatus d100 accesses two cache servers 7, and the display apparatus d101 also accesses the same two cache servers 7. However, when a pair of the display apparatus 11 and cache server 7 is different, the network path is also different, so the average throughput may also be different.

Figures 21, 24:
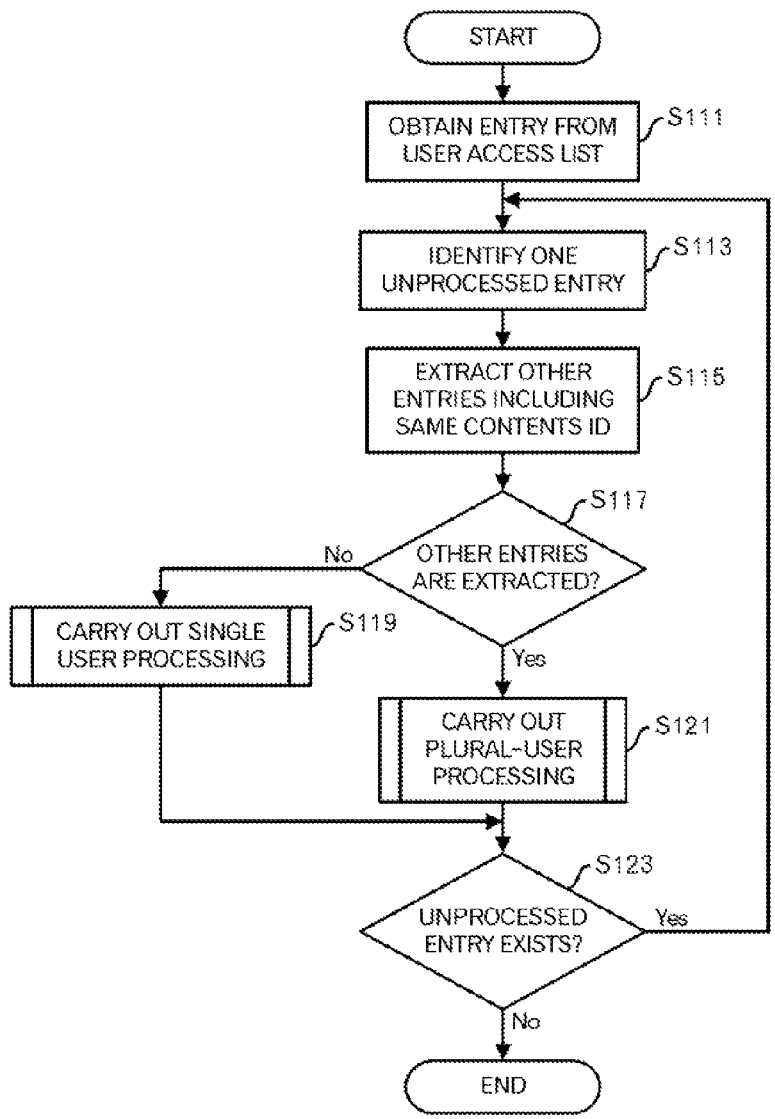
FIG. 21 is a diagram depicting an example of data stored in a fifth management table in the center server.
FIG. 24 is a diagram depicting a processing flow in the third embodiment.
Figure 23:
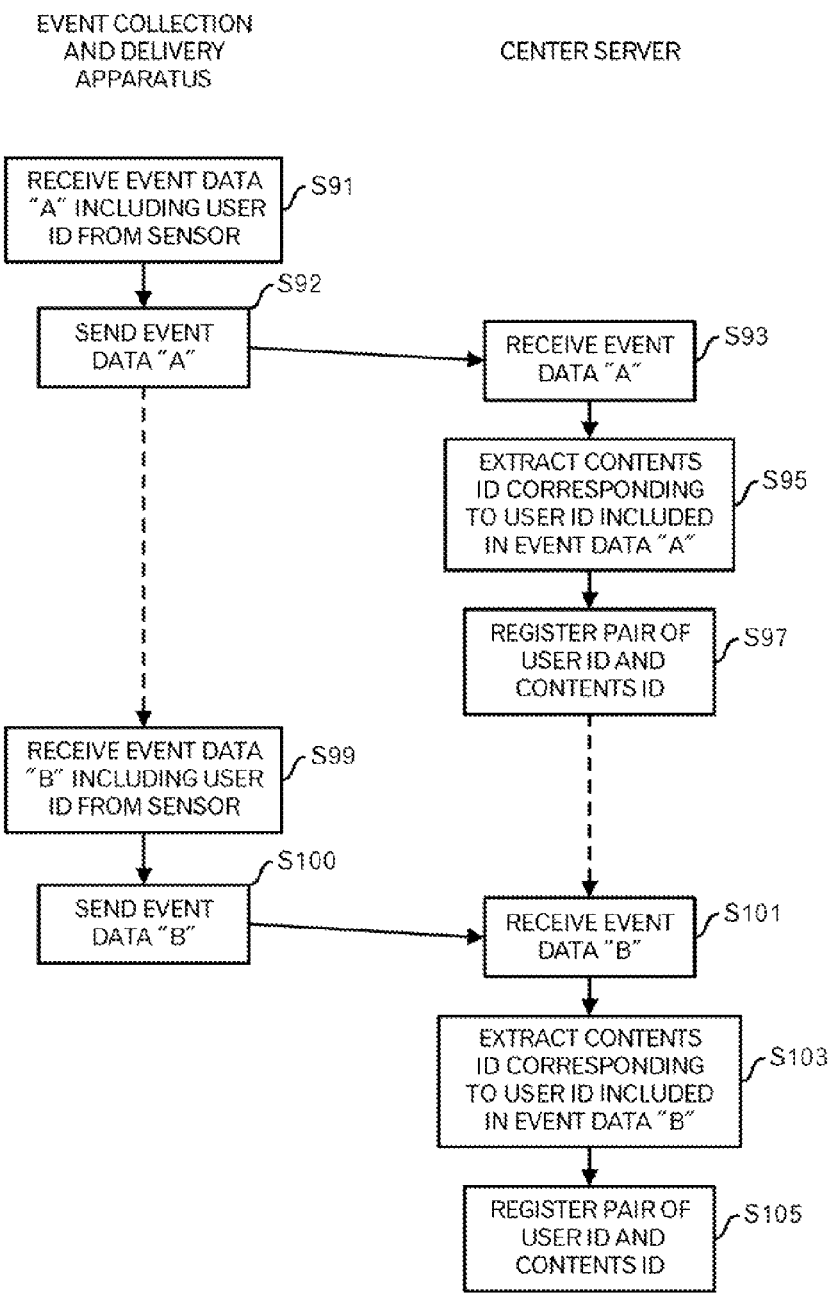
FIG. 23 is a diagram depicting a processing flow in the third embodiment.

FIG. 21 illustrates an example of data that is stored in the fifth management table 3153. In the example in FIG. 21, for each contents ID, one or more output condition, the storage destination of the contents data corresponding to each output condition, and the size of the contents data are stored. As illustrated in FIG. 21, when plural files are correlated with a contents ID, those files are handled as a set with the output conditions.

When the event receiver 311 receives event data from the event collection and delivery apparatus 5, the event receiver 311 outputs that event data to the contents determination unit 312. The contents determination unit 312 reads data from the first management table 3131 that is stored in the first data storage unit 313, and updates the user access list 3141 in the second data storage unit 314. The transmission destination determining unit 316 reads an entry from the user access list 3141, for example, periodically, and then by using the third to fifth management tables 3151 to 3153 that are stored in the third data storage unit 315, the transmission destination determining unit 316 identifies the contents ID and the cache server 7 that is the delivery destination for the contents data having that contents ID, and outputs the identified data to the contents delivery unit 317. The contents delivery unit 317 reads the contents data having the contents ID from the contents storage unit 318, and delivers the contents data to the cache server 7 that is the delivery destination.

When a contents request is received from a cache server 7, the contents delivery unit 317 reads the data for the contents from the contents storage unit 318 and transmits the read data to the cache server 7 that is the request source.

Next, FIG. 22 illustrates a configuration example of the cache server 7 relating to this embodiment. As illustrated in FIG. 22, the cache server 7 relating to this embodiment has an almost similar configuration to that of the cache server 7 in the first embodiment, except for the message receiver 71 and the cache confirming unit 72 being removed. However, a following point is different, namely, the contents obtaining unit 73 receives delivered contents data from the center server 3 and stores that contents data in the second data storage unit 76, registers data concerning that contents data in the second management table 742 without correlating that data with the user ID. The data formats of the first management table 741 and the second management table 742 are the same as those data formats in the first embodiment.

Next, the processing in this embodiment will be explained using FIG. 23 to FIG. 31B.

The event receiver 51 of the event collection and delivery apparatus 5 receives event data A that includes a user ID (for example, "u123") from a sensor 9 (FIG. 23: step S91), and outputs that event data A to the event transfer unit 54. The event transfer unit 54 transmits that event data A to the center server 3 (step S92). The event receiver 311 of the center server 3 receives the event data A from the event collection and delivery apparatus 5 (step S93), and outputs that event data A to the contents determination unit 312.

When the contents determination unit 312 receives the event data A, the contents determination unit 312 extracts the contents ID (for example, "c20") that corresponds to the user ID that is included in the event data A from the first management table 3131 (step S95). Then, the contents determination unit 312 registers a pair of the user ID and contents ID in the user access list 3141 (step S97).

Moreover, the event receiver 51 of the event collection and delivery apparatus 5 receives event data B that includes a user ID (for example, "u222") from a sensor 9 (step S99), and outputs that event data B to the event transfer unit 54. The event transfer unit 54 transmits the event data B to the center server 3 (step S100). The event receiver 311 of the center server 3 receives the event data B from the event collection and delivery apparatus 5 (step S101), and outputs that event data B to the contents determination unit 312.

When the contents determination unit 312 receives the event data B, the contents determination unit 312 extracts the contents ID (for example, "c20") that corresponds to the user ID that is included in that event data B from the first management table 3131 (step S103). Then, the contents determination unit 312 registers a pair of the user ID and contents ID in the user access list 3141 (step S105).

By carrying out this processing, the first two entries such as illustrated in FIG. 18 are stored in the user access list 3141. In addition, such a processing is repeated.

Next, the processing executed by the transmission destination determining unit 316 or the like will be explained using FIG. 24 to FIG. 30. This processing is carried out asynchronously to the processing in FIG. 23, for example, at fixed intervals (1 second intervals or the like).

The transmission destination determining unit 316 reads all of the currently registered entries from the user access list 3141 (FIG. 24: step S111). The data of the read entries is deleted from the user access list 3141.

Then, the transmission destination determining unit 316 identifies one unprocessed entry from among a set of read entries (step S113). The identified entry is deleted from the set of entries. The transmission destination determining unit 316 then extracts other entries that include the same contents ID as the contents ID that is included in the identified entry from the set of entries (step S115).

For example, when three entries are registered in the user access list 3141 as illustrated in FIG. 18, these three entries are registered in the set of entries, and other entries that include the same contents ID as the contents ID "c20" that is included in the first entry ("c20" and "u123") are the second entry ("c20" and "u222") and the third entry ("c20" and "u333"). When other entries have been extracted at the step S115, these other entries are also deleted from the set of entries.

When other entries are not extracted at the step S115 (step S117: NO route), there is only one user to whom the same contents data is to be delivered at this timing, so the transmission destination determining unit 316 carries out a single user processing (step S119). Then, the processing then moves to step S123.

On the other hand, when other entries are extracted at the step S115 (step S117: YES route), there are more than one user to whom the same contents data is to be delivered at this timing, so the transmission destination determining unit 316 carries out a plural-user processing (step S121).

After the step S119 or step S121, the transmission destination determining unit 316 determines whether or not there is an unprocessed entry in the set of entries (step S123). When there is an unprocessed entry in the set of entries, the processing returns to the step S113. On the other hand, when there is no unprocessed entry in the set of entries, the processing at this timing ends.

Figure 25:
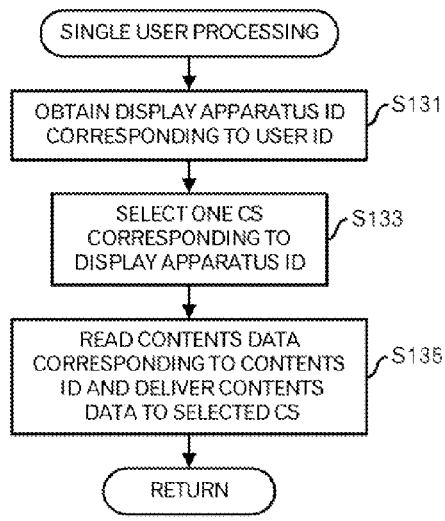
FIG. 25 is a diagram depicting a processing flow of a single user processing.

Next, the single user processing will be explained using FIG. 25. The transmission destination determining unit 316 searches the third management table 3131 by using the user ID that is included in the identified entry to obtain the display apparatus ID that corresponds to the user ID (FIG. 25: step S131). Then, the transmission destination determining unit 316 searches the fourth management table 3152 by using the display apparatus ID that was obtained to select one address of a cache server 7 that corresponds to the display apparatus ID (step S133). In the example in FIG. 20, two cache servers 7 are registered in association with the display apparatus ID "d100", so a cache server 7 may be selected randomly, for example, or the cache server 7 having the greatest value of the average throughput may be selected.

After selecting the address of the cache server 7, the transmission destination determining unit 316 outputs the contents ID and the address of the cache server 7 to the contents delivery unit 317. When the contents delivery unit 317 receives the contents ID and address of the cache server 7, the contents delivery unit 317 reads the contents data (including the output conditions and actual contents data) that corresponds to the contents ID from the contents storage unit 310, and delivers the contents data to the selected cache server 7 (step S135).

Therefore, when the contents obtaining unit 73 of the cache server 7 receives the contents data from the center server 3, the contents obtaining unit 73 stores the contents data in the second data storage unit 76. Then, the contents obtaining unit 73 registers the contents ID, the output conditions and the storage destination of the contents data in the second management table 742.

The plural-user processing will be explained using FIG. 26 to FIG. 31A.

First, the transmission destination determining unit 316 searches the third management table 3151 by using the user ID that is included in the entry identified at the step S113 and the entries extracted at the step S115 (hereafter, called the processing target entries) to identify the display apparatus ID that corresponds to the user ID (step S141). The transmission destination determining unit 316 their generates a display apparatus list that includes the identified display apparatus ID, and stores that list in the third data storage unit 315, for example.

The transmission destination determining unit 316 then searches the fourth management table 3152 by using the identified display apparatus ID to obtain the address and average throughput of the cache server 7 that corresponds to the display apparatus ID (step S143).

Figure 27:
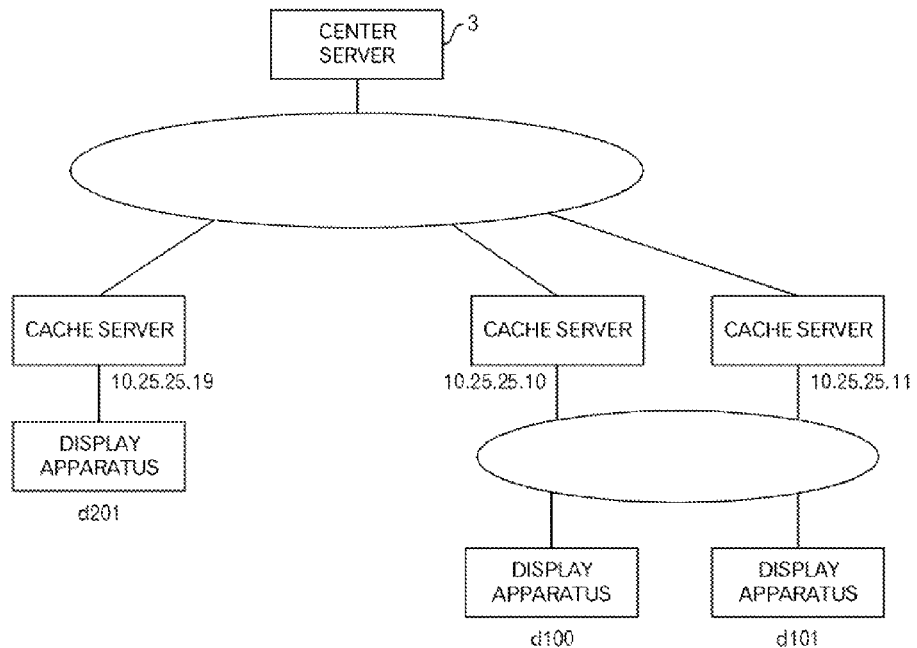
FIG. 27 is a system outline diagram schematically depicting a specific example.
Figure 26:
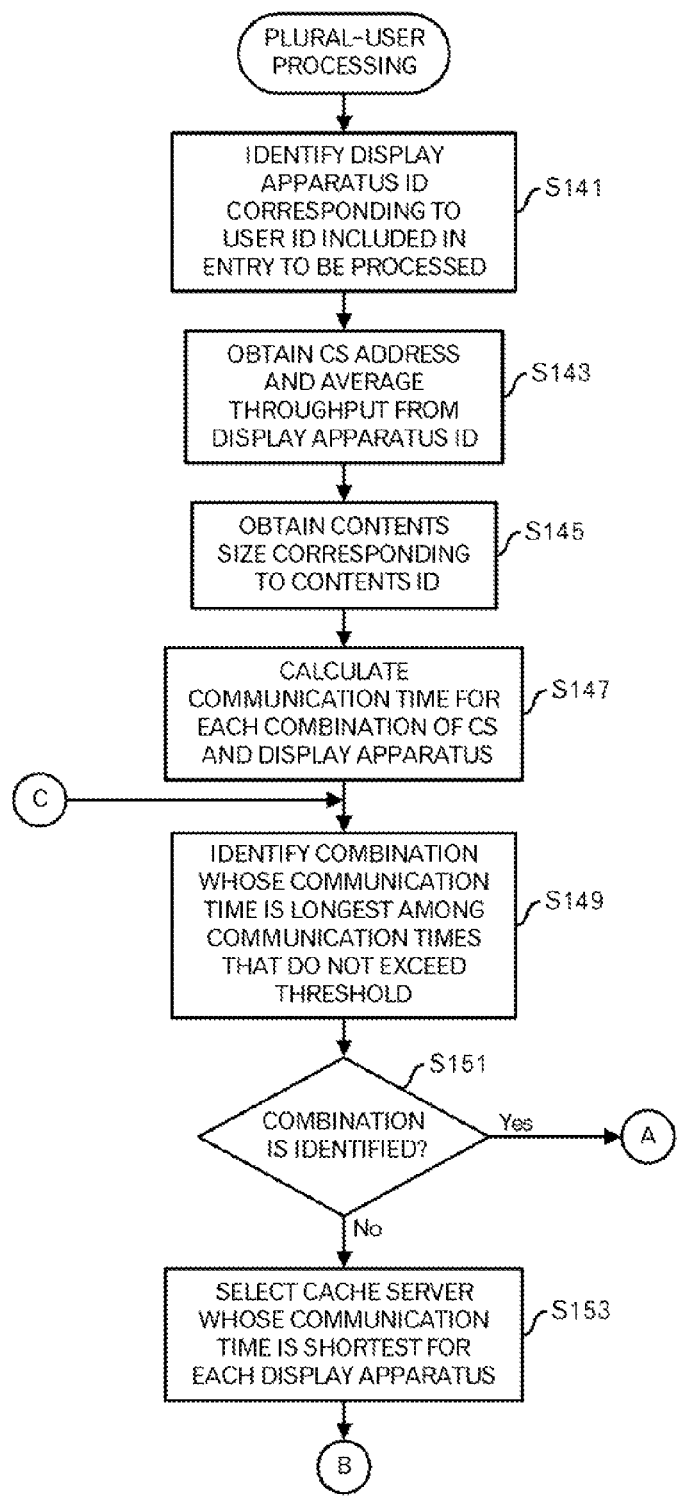
FIG. 26 is a diagram depicting a processing flow of a plural-user processing.

When the three entries illustrated in FIG. 18 are processed, data such as illustrated in FIG. 20 is obtained at the step S143. Display apparatuses d100 and d101 are connected to both cache server "10.25.25.10" and cache server "10.25.25.11". In other words, as seen from the display apparatuses d100 and d101, there is a common cache server "10.25.25.10", and there is also another common cache server "10.25.25.11". On the other hand, as for the extracted third entry having the same contents ID, the display apparatus d201 is extracted, and the cache server 7 to which that display apparatus d201 is connected is "10.25.25.19", and this cache server 1 is not connected to the display apparatuses d100 and d101. When illustrated schematically, a connection relationship such as illustrated in FIG. 27 is obtained. In such a case, the contents data "c20" is delivered to one of the common cache servers "10.25.25.10" and "10.25.25.11", and by having the display apparatuses d100 and d101 access that one cache server, utilization efficiency of the second data storage unit 76 in the cache server 7 is improved. Which of the common cache servers to select is determined by taking into consideration the response time to the user on the display apparatus. In other words, as many display apparatuses as possible share a common cache server, and the communication time between the display apparatus and cache server, which affects the response time, is kept below a threshold value.

On the other hand, the display apparatus d201 has to use the cache server "10.25.25.19", so the contents data "c20" is transmitted to the cache server "10.25.25.19".

Moreover, the transmission destination determining unit 316 searches the fifth management table 3153 by using the contents ID of the processing target to obtain the file size (step S145). For example, here, as for contents ID "c20", it is assumed that a file size of "20 M" is obtained.

The transmission destination determining unit 316 then calculates the communication time by "file size/average throughput" for each combination of the display apparatus whose display apparatus ID is registered in the display apparatus list and the cache server 7 whose address is identified at the step S143, and registers that communication time in a combination list (step S147).

Figures 28, 30:
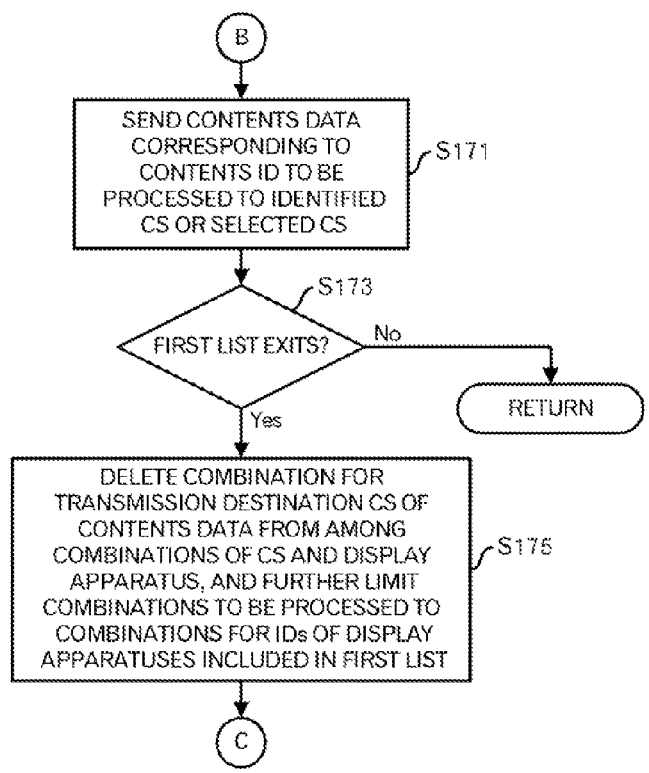
FIG. 28 is a diagram depicting an example of a combination list.
FIG. 30 is a diagram depicting a processing flow of the plural-user processing.

An example of the combination list is illustrated in FIG. 28. When combining three cache servers and three display apparatuses, nine combinations are generated, however, in the case of a connection relationship as illustrated in FIG. 27, the average throughput for the combinations of the cache servers "10.25.25.10" and "10.25.25.11" and the display apparatus "d201" are not registered in the fourth management table 3152, so the communication times cannot be calculated. In addition, the average throughput for the combinations of the cache servers "10.25.25.19" and the display apparatuses d100 and d101 are also not registered in the fourth management table 3152, so the communication times cannot be calculated.

The transmission destination determining unit 316 then identifies the combination having the longest communication time from among the communication times that do not exceed a threshold value (for example "1.0") (step S149). In the example in FIG. 28, the combination of the display apparatus d101 and the cache server "10.25.25.11", which has the communication time of "1.0", is identified.

Here, when it is possible to identify a combination that satisfies the conditions of the step S149 (step S151: YES route), the processing moves to the processing in FIG. 23 by way of a terminal A. On the other hand, when it is not possible to identify a combination that satisfies the conditions of the step S149 (step S151: NO route), the transmission destination determining unit 316 selects the cache server 7 having the shortest communication time for each display apparatus ID in the display apparatus list (step S153). In the case where the cache server 7 having the priority for each display apparatus is known, that cache server 7 may be selected. The processing then moves to step S171 in FIG. 30 by way of a terminal B.

Figure 29:
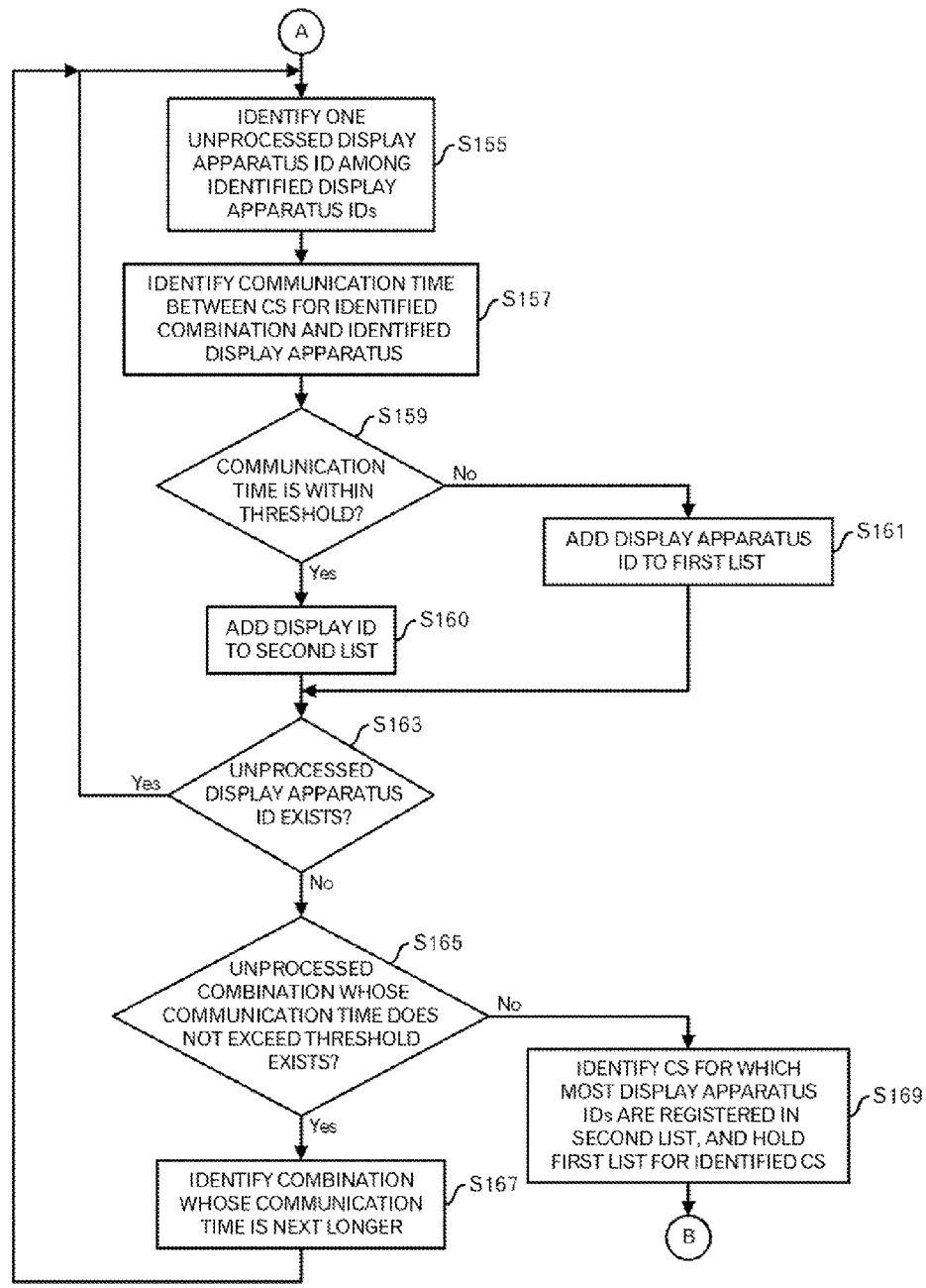
FIG. 29 is a diagram depicting a processing flow of the plural-user processing.

Moving to an explanation of the processing in FIG. 29, the transmission destination determining unit 216 identifies one unprocessed display apparatus ID from among the display apparatus IDs that are included in the display apparatus list identified at the step S141 (step S155). The transmission destination determining unit 316 then identifies, from the combination list, the communication time between the cache server 7 for the combination identified at the step S149 and the display apparatus having the identified display apparatus ID (step S157). In checking a table in FIG. 28 for the communication times corresponding to the combinations of the cache server "10.25.25.11" and the display apparatuses d100, d101 and d201, the communication time for the display apparatus d100 is "1.33", and "–" is set for the display apparatus d201.

The transmission destination determining unit 316 determines whether or not the communication time is within a threshold value (step S159). When the communication time is within the threshold value, the transmission destination determining unit 316 adds the display apparatus ID to a second list (step S160). The processing then moves to step S163. On the other hand, when the communication time exceeds the threshold value, the transmission destination determining unit 316 adds the display apparatus ID to a first list (step S161). The processing then moves to the step S163.

By doing so, "d100" and "d201" are registered in the first list, and "d101" is registered in the second list.

The transmission destination determining unit 316 then determines whether or not there is an unprocessed display apparatus ID (step S163), and when there is an unprocessed display apparatus ID, the processing returns to the step S155. On the other hand, when there is no unprocessed display apparatus ID, the transmission destination determining unit 316 determines whether or not there is an unprocessed combination for which the communication time does not exceed the threshold value and that is for a different cache server (step S165).

When there is an unprocessed combination for which the communication time does not exceed the threshold value and that is for a different cache server, the transmission destination determining unit 315 identifies a combination having the next longer communication time (step S167). In the example in FIG. 28, the communication time of the combination of the display apparatus "d100" and the cache server "10.25.25.10" is "0.8", so this combination is identified. The processing then returns to the step S155. The first list and second list are stored in association with the addresses of the cache servers 7, for example, in the third data storage unit 315.

When the processing is carried out for the next combination, "d201" is registered in the first list, and "d100" and "d101" are registered in the second list.

In the example of FIG. 28, there is a combination (the display apparatus "d101" and the cache server "10.25.25.10") having a communication time of "0.67", however, the processing has already been carried out for the cache server "10.25.25.10", so the processing is not carried out for this combination.

On the other hand, when there is no unprocessed combination for which the communication time does not exceed the threshold value and that is for a different cache server, the transmission destination determining unit 316 identifies a cache server 7 for which the most display apparatus IDs are registered in the second list, and holds the first list for that cache server 7 (step S169). In the case where there are cache servers 7 for which the number of display apparatus IDs is the same, one cache server is selected randomly or by other methods. The processing then moves to the processing in FIG. 30 by way of the terminal 8.

By doing so, a common cache server 7 is identified for which the communication time is a predetermined time or less and that can be accessed by as many display apparatuses as possible. Display apparatus IDs of the display apparatuses that cannot be coped with thus cache server are included in the first list.

In the embodiment described above, the cache server "10.25.25.10" is identified, and "d201" is registered in the first list.

Moving to an explanation of the processing in FIG. 30, the transmission destination determining unit 316 outputs the address of the cache server 7 that was identified at the step S169 or the cache server 7 that was selected at the step S153, and the contents ID to be processed to the contents delivery unit 317. When the contents delivery unit 317 receives the address of the cache server 7 and the contents ID, the contents delivery unit 317 reads the contents data that corresponds to that contents ID from the contents storage unit 318, and transmits that contents data to the address of the cache server 7 (step S171).

The transmission destination determining unit 316 then determines whether or not there is a first list (step S173). When there is no first list, for example, when this step was arrived at by way of the step S153, there is no first list. Therefore, the processing returns to the calling-source processing.

On the other hand, when there is a first list, the transmission destination determining unit 316 deletes the combinations for the transmission destination cache server of the contents data from the combinations of the cache servers 7 and the display apparatuses 11 (the combination list in FIG. 28), and further limits the processing target to the combinations for the display apparatus IDs included in the first list (step S175). The processing then returns to the step S149 in FIG. 26 by way of a terminal C.

Figures 31A, 31B:
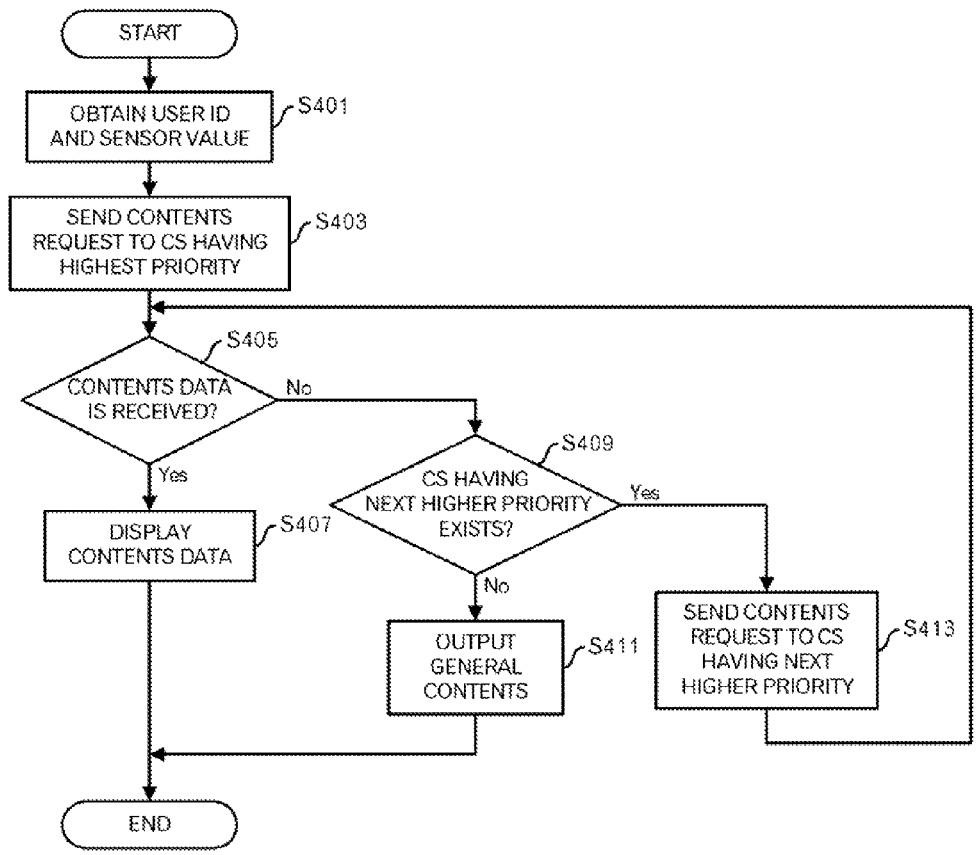
FIG. 31A is a diagram depicting a state after processing a combination list.
FIG. 31B is a diagram depicting a processing flow of the display apparatus.

In the embodiment described above, when deleting combinations for the cache server "10.25.25.10" and limiting the processing target to combinations for the display apparatus "d201", the processing target is limited to a combination such as illustrated in FIG. 31A.

After returning to the step S149 by way of the terminal C in this processing, the processing then moves to the step S153 and advances. In other words, the contents data is transmitted to the cache server "10.25.25.19".

Each display apparatus 11 carries out a processing such as illustrated in FIG. 31B. The IC card reader 111 of the display apparatus 11 reads the user ID from the IC card of the user, and outputs that user ID to the transmitter 113. In response to a request from the transmitter 113, for example, the temperature sensor 112 outputs a measured value of the temperature to the transmitter 113. When the transmitter 113 obtains the user ID and a sensor value (temperature) (step S401), the transmitter 113 transmits a contents request that includes the user ID and the sensor value to the cache server 7 of this display apparatus 11, which has the highest priority (step S403). The receiver 114 determines whether or not the contents data could be received within a predetermined amount of time (step S405). When the contents data could not be received within the predetermined amount of time, the receiver 114 notifies the transmitter 113 of that. On the other hand, when the contents data could be received within the predetermined amount of time, the display unit 117 displays the contents (step S407). After receiving a notification from the receiver 114, the transmitter 113 checks whether or not there is a cache server 7 having next higher priority (step S409). In this embodiment, access destination cache servers 7 are ranked, and the contents requests are transmitted in order from the cache server having the highest priority. When there is no cache server 7 having next higher priority, the transmitter 113 notifies the receiver 114 that a contents request could not be transmitted, and in response to this notification, the receiver 114 instructs the output unit 116 to output general contents. The output unit 116 outputs general contents that are stored in the buffer 115 to the display unit 117 (step S411).

On the other hand, when there is a cache server 7 having the next higher priority, the transmitter 113 transmits a contents request to the cache server 7 having the next higher priority (step S413). The processing then returns to the step S405.

In this way, even when there is no contents data in the cache server 7 having the highest priority, it is possible to obtain contents data from another accessible cache server 7. In this embodiment, when the cache server 7 does not have contents data relating to the contents request from the display apparatus 11, a contents request may not be transmitted to the center server 3. This is because the processing load on the center server 3 is lowered and, when the display apparatus 11 accesses a cache server 7 that is not the cache server 7 having the highest priority and obtains the contents data, there is a possibility that the contents data that is cached may become useless.

By carrying out a processing such as described above, the delivery destination of the contents data is reduced, so the amount of data that is cached in the cache server 7 can be reduced for the overall system.

An example was given of transmitting contents data at the step S171, however, a contents ID may be transmitted, and after the contents obtaining unit 73 of the cache server 7 checks whether or not the contents data corresponding to this contents ID is cached in the second data storage unit 76 and when it is found that the contents data is not cached, a request may be sent. By doing so, it is possible to reduce the amount of delivered data.

Furthermore, the center server 3 may manage the contents ID of the contents cached by each cache server 7, and the center server 3 may deliver the contents data after checking the management data as to whether or not data is to be actually delivered. In this way, it is also possible to reduce the amount of data to be delivered.

Embodiment 4

In the third embodiment, an example in which the center server 3 carries out the main processing was explained. This is because collecting the event data from plural event collection and delivery apparatuses 5 has an advantage in that it is easy to find users to which the same contents are to be delivered. On the other hand, when the event data is transmitted to the center server 3, there is a possibility that the processing load on the center server 3 will become high.

Therefore, in this embodiment, a processing that was carried out by the center server 3 in the third embodiment is conducted by the event collection and delivery apparatuses 5.

The system configuration of this embodiment is the same as the system configuration of the first and second embodiments, so an explanation here is omitted. The configuration of the center server 3 and the display apparatuses 11 is also the same as in the first embodiment, so and explanation here is omitted.

Figure 32:
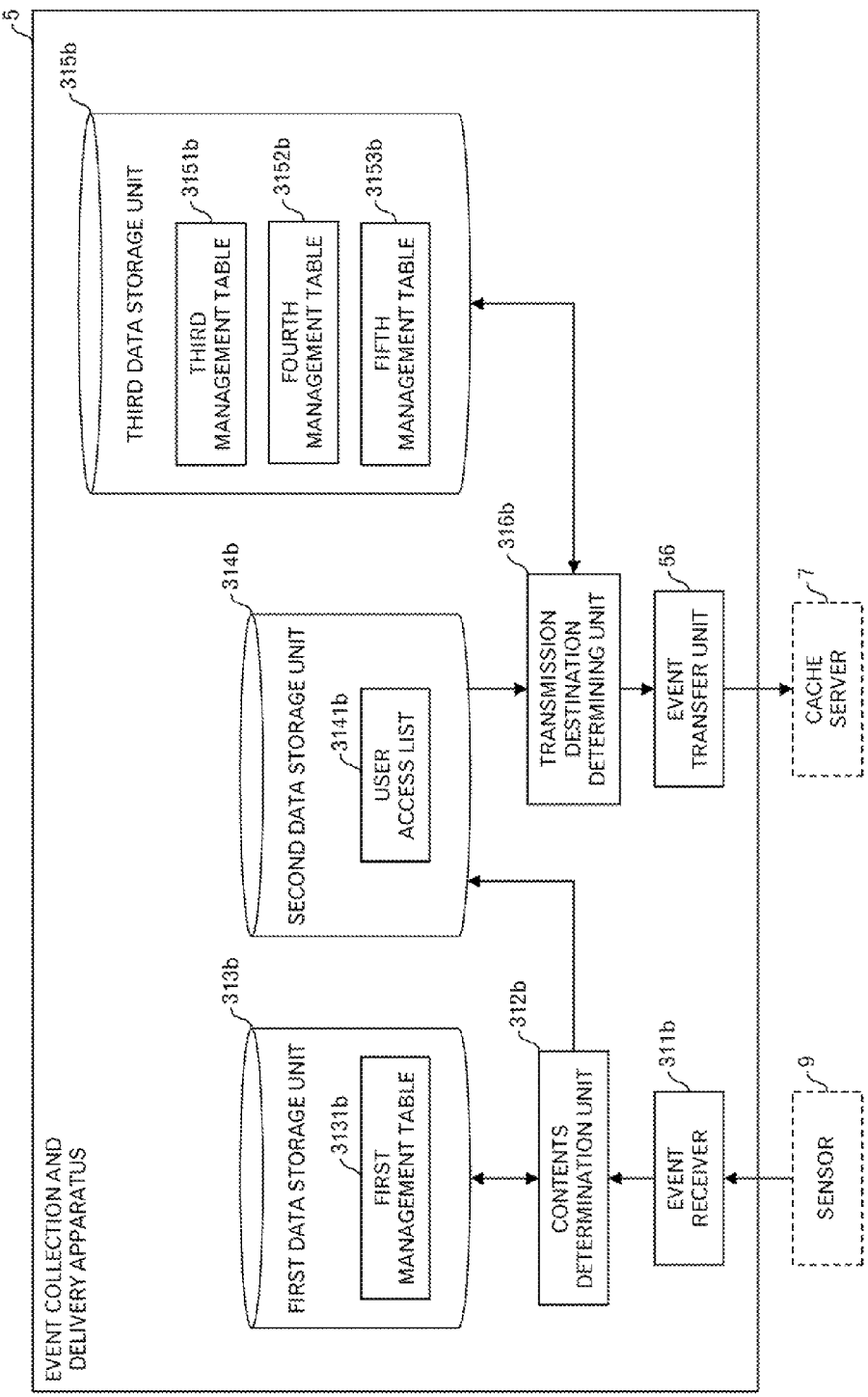
FIG. 32 is a functional block diagram of an event collection and delivery apparatus relating to a fourth embodiment.

The configuration of the event collection and delivery apparatus 5 relating to this embodiment is illustrated in FIG. 32. The configuration of the center server 3 relating to this embodiment is mainly the same as the construction of the center server 3 in the third embodiment, so in the explanation, "b" is added to reference numbers for component elements that are mostly the same in FIG. 16.

The event collection and delivery apparatus 5 has an event receiver 311b, a contents determination unit 312b, a first data storage unit 313b, a second data storage unit 314b, a third data storage unit 315b, a transmission destination determining unit 316b, and an event transfer unit 56. The difference with the configuration illustrated in FIG. 16 is that there is no contents storage unit 318, and instead of the contents delivery unit 317, there is an event transfer unit 56.

Moreover, the first data storage unit 313b stores a first management table 3131b. The second data storage unit 314b stores a user access list 3141b. The third data storage unit 315b stores a third management table 3151b, a fourth management table 3152b and a fifth management table 3153b.

When the event receiver 311b receives the event data from a sensor 9, the event receiver 311b outputs that event data to the contents determination unit 312b. The contents determination unit 312b reads data from the first management table 3131b that is stored in the first data storage unit 313b, and updates the user access list 3141b in the second data storage unit 314b. The transmission destination determining unit 316b roads an entry from the user access list 3141b, for example, periodically, and identifies a cache server 7 as the transfer destination of the event data by using the third to fifth management tables 3151b to 3153b stored in the third data storage unit 315b, and outputs data of the identified cache server 7 to the event transfer unit 56. The event transfer unit 56 transmits the event data that includes a user ID to foe processed to the identified cache server 7.

The detailed contents of the processing in this embodiment mainly follow the processing flow explained in the third embodiment. Each step is carried out by each of the component elements in the event collection and delivery apparatus 5 illustrated in FIG. 32, and the transmission source of the event data is a sensor 9.

Figures 33, 36:
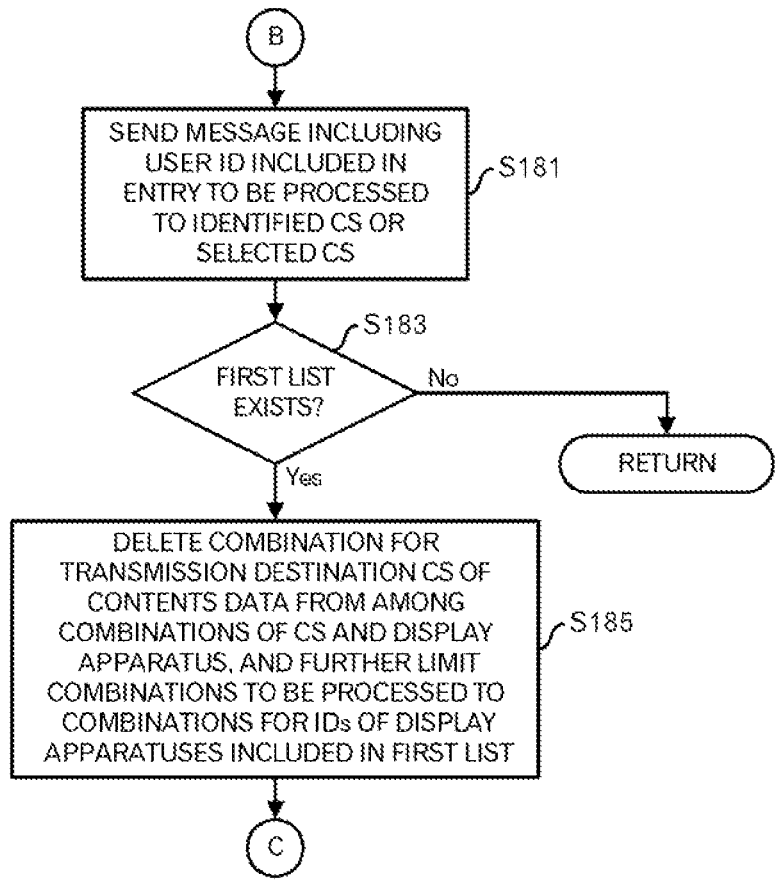
FIG. 33 is a diagram depicting a processing flow in the fourth embodiment.
FIG. 36 is a diagram depicting an example of data stored ins a third management table in the event collection, and delivery apparatus relating to the fifth embodiment.

The different portion of the processing is the portion in FIG. 30 in the third embodiment, which is replaced with a processing such as illustrated in FIG. 33.

More specifically, the transmission destination determining unit 316b outputs the address of the cache server 7 that was identified at the step S169 or the cache server 7 that was selected at the step S153, and the user ID with which the display apparatus that is associated with the identified or selected cache server 7 is correlated, to the event transfer unit 56. When the event transfer unit 56 receives the address of the cache server 7 and the user ID, the event transfer unit 56 transmits the event data that includes that user ID to the address of the cache server 7 (step S181).

In the example used for the third embodiment, the display apparatuses "d100" and "d101" correspond to the cache server "10.25.25.10", and user IDs "u123" and "u222" are correlated with these display apparatuses. Therefore, the event data that includes "u123" and "u222" is transmitted to the cache server "10.25.25.10".

Similarly, the display apparatus "d201" is correlated with the cache server "10.25.25.19", and the user ID "u333" is correlated with this display apparatus. Therefore, event data that includes "u333" is transmitted to the cache server "10.25.25.19".

Then, the transmission destination determining unit 316b determines whether or not there is a first list (step S183). When there is no first list, for example, when this step is arrived at by way of the step S153, there is no first list, so the processing returns to the calling-source processing.

However, when there is a first list, the transmission destination determining unit 316b deletes the combination for the transmission destination cache server of the contents data from the combinations of the cache servers 7 and the display apparatuses (the combination list in FIG. 28), and further limits the processing target to the combinations for the display apparatus IDs included in the first list (step S185). The processing then returns to the step S149 in FIG. 26 by way of the terminal C.

By performing the processing described above, a processing is performed in a distributed manner by the event collection and delivery apparatuses 5, so it is possible to reduce the processing load on the center server 3.

The contents ID itself is also identified by the event collection and delivery apparatus 5, so by transmitting the contents ID together with the user ID to the cache server 7, it is possible to reduce the amount of processing by the cache server 7.

Embodiment 5

In the third embodiment, by using the contents ID as a key, when there is a schedule to deliver the contents of that contents ID to plural users, whether or not a cache server 7 can be shared is determined. Therefore, when causing a computer other than the center server 3 to carry out the processing relating to the third embodiment, chances to share the cache server 7 increase by collecting event data based on the contents ID. In this embodiment, contents deployment destination determination servers are newly introduced.

Figure 34:
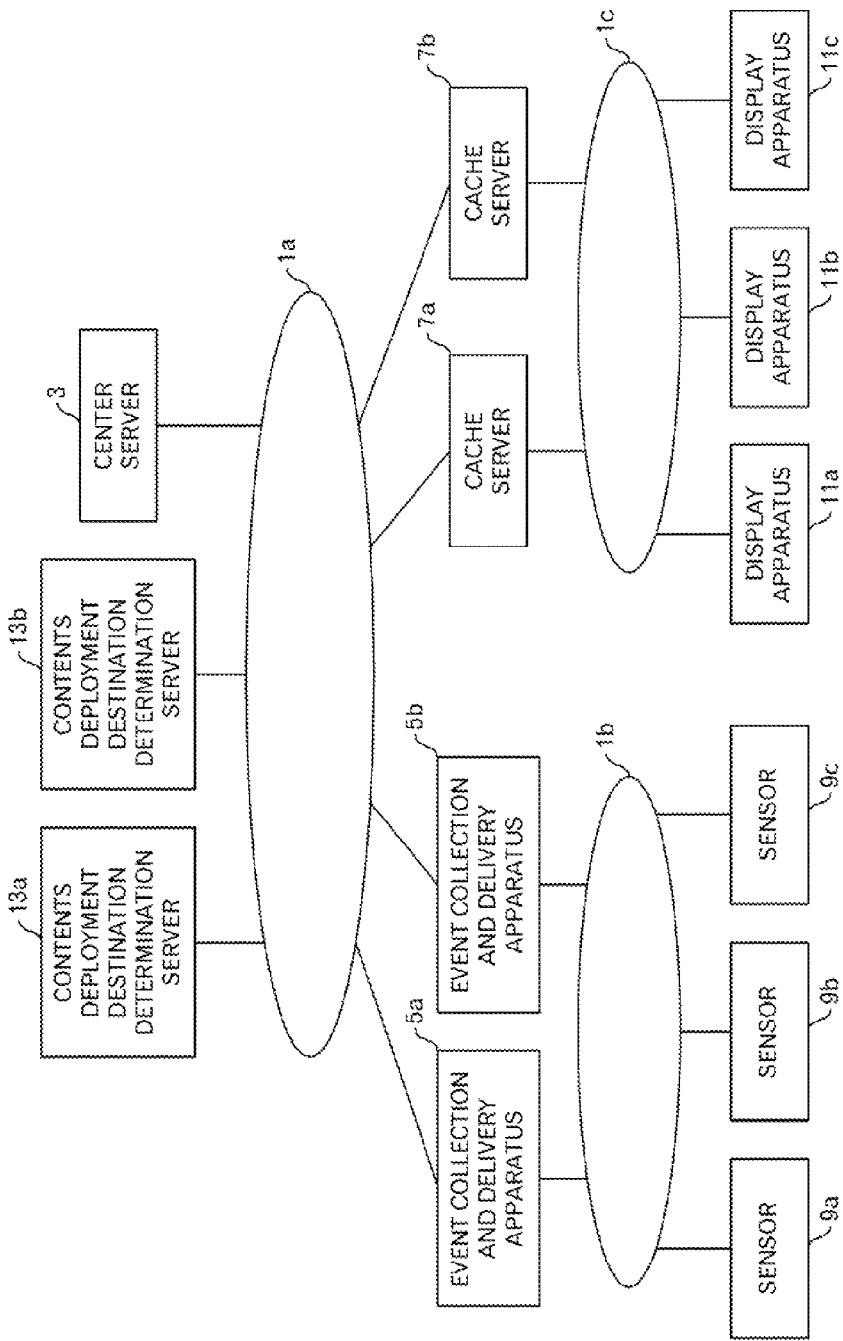
FIG. 34 is an outline diagram of a system configuration relating to a fifth embodiment.

In other words, a system such as illustrated in FIG. 34 is employed. In the example in FIG. 34, a center server 3 that stores contents data used in the system, event collection and delivery apparatuses 5 (5*a* and 5*b* in FIG. 34), cache servers 7 (7*a* and 7*b* in FIG. 34) and newly employed contents deployment destination determination servers 13 (13*a* and 13*b* in FIG. 34) are connected to a network 1*a*. The event collection and delivery apparatuses 5*a* and 5*b* and plural sensors 9 (9*a*, 9*b* and 9*c* in FIG. 34) are connected to a network 1*b*. The cache servers 7*a* and 7*b* and display apparatuses 11 (11*a*, 11*b* and 11*c* in FIG. 34) are connected to a network 1*c*.

For example, the event collection and delivery apparatuses 5 and the contents deployment destination determination servers 13 are in a many-to-many relationship. However, there are cases in which there is only one contents deployment destination determination server 13.

In this embodiment, the configuration of the center server 3 is the same as the configuration in the first embodiment. Moreover, the configurations of the sensors 9, cache servers 7 and display apparatuses 11 are the same as those in the first embodiment.

Figures 35, 37:
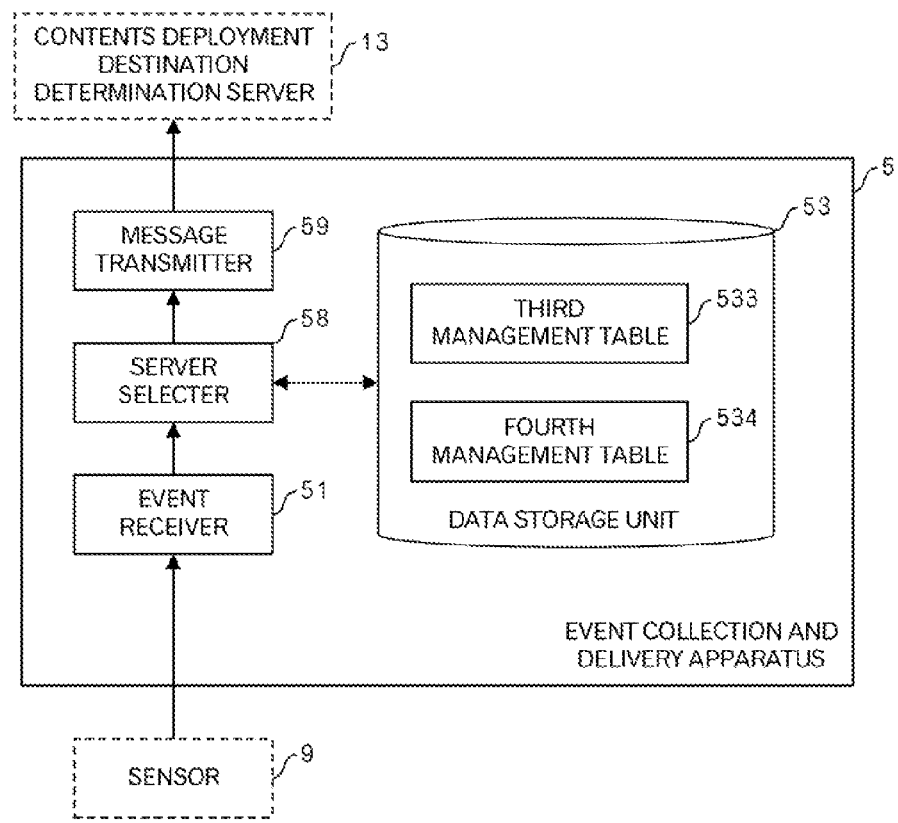
FIG. 35 is a functional block diagram of an event collection and delivery apparatus in the fifth embodiment.
FIG. 37 is a diagram depicting an example of data stored in a fourth management table in the event collection and delivery apparatus relating to the fifth embodiment.

A configuration example of an event collection and delivery apparatus 5 is illustrated in FIG. 35. The event collection and delivery apparatus 5 relating to this embodiment has an event receiver 51, a server selector 58, a message transmitter 59, and a data storage unit 53. The data storage unit 53 stores a third management table 533 and a fourth management table 534.

Thus, the server selector 58 and the message transmitter 59 are newly employed. The third management table 533 and fourth management table 534 are also newly employed in the data storage unit 53.

The event receiver 51 receives event data that includes user ID from a sensor 9, and outputs that event data to the server selector 58. The server selector 58 identifies, from the third management table 533 and fourth management table 534 that are stored in the data storage unit 53, a contents deployment destination determination server 13, which will be the message transmission destination, and outputs data for the message to be transmitted and the address of the contents deployment destination determination server 13 to the message transmitter 55. The message transmitter 59 transmits a message to the designated contents deployment destination determination server 13.

Data such as illustrated, for example, in FIG. 36 is stored in the third management table 533, In the example in FIG. 36, a contents ID is registered in association with a user ID.

Furthermore, data such as illustrated in FIG. 37, for example, is stored in the fourth management table 534. In the example in FIG. 37, the address of the contents deployment destination determination server 13 is registered in association with the contents IDs. For the contents ID, a range of the contents IDs may be designated with a wildcard "*".

Figure 38:
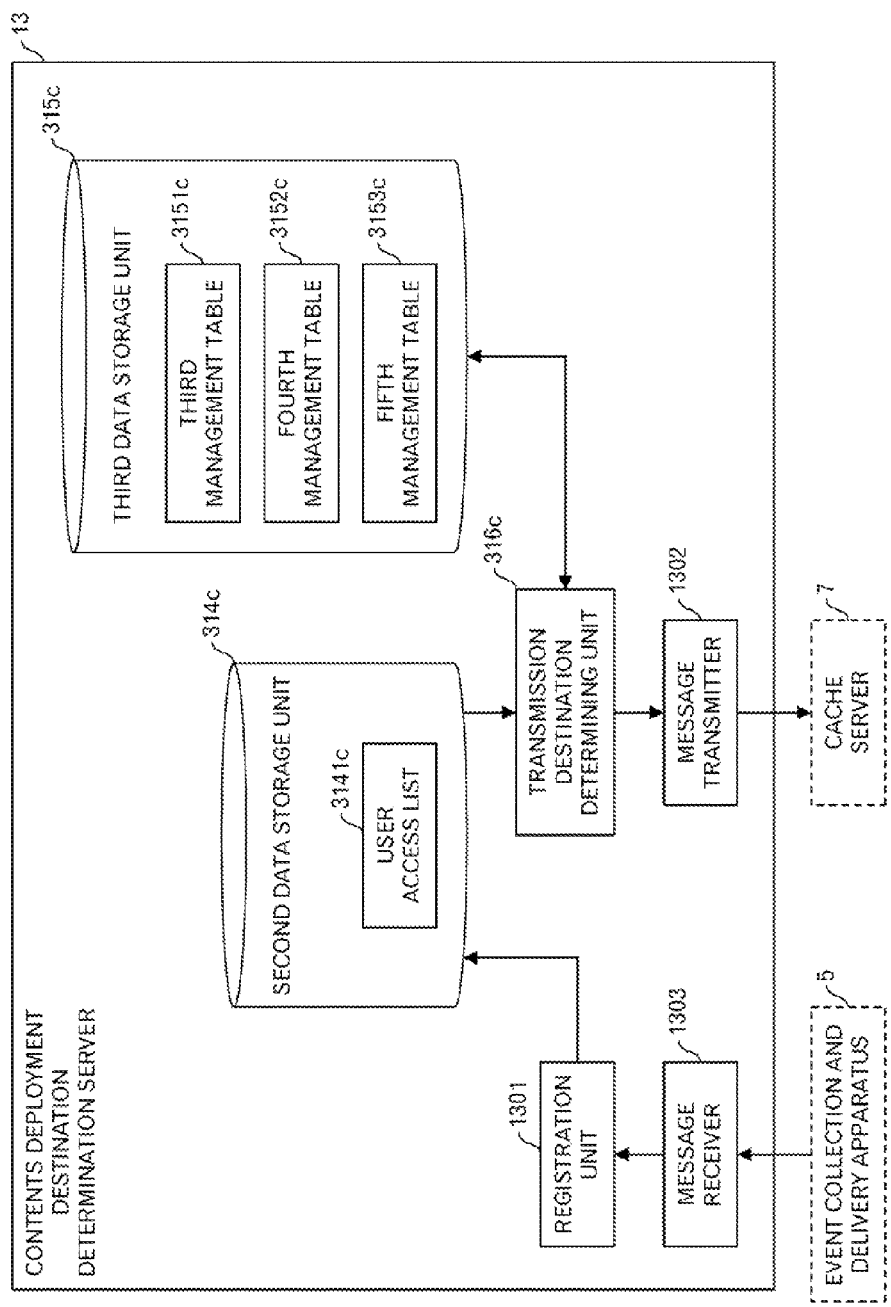
FIG. 38 is a functional block diagram of a contents delivery destination determination server.

A configuration example of the contents deployment destination determination server 13 relating to this embodiment is illustrated in FIG. 38. As for component elements that are the same as those in the center server 3 illustrated in FIG. 16, a "c" is added to the same reference numbers for distinction.

The contents deployment destination determination server 13 has a message receiver 1303, a registration unit 1301, a second data storage unit 314*c*, a third data storage unit 315*c*, a transmission destination determining unit 316*c*, and a message transmitter 1302. The second data storage unit 314*c* stores a user access list 3141*c*. The third data storage unit 315*c* stores a third management table 3151*c*, a fourth management table 3152*c* and a fifth management table 3153*c*.

When the message receiver 1303 receives a message that includes a user ID and a contents ID from an event collection and delivery apparatus 5, the message receiver 1303 outputs that message to the registration unit 1301. The registration unit 1301 updates the user access list 3141*c* in the second data storage unit 314*c* with the user ID and contents ID that are included in the message. The transmission destination determining unit 316*c* reads an entry from the user access list 3141*c*, for example, periodically, and uses the third to fifth management tables 3151*c* to 3153*c* that are stored in the third data storage unit 315*c* to identify a cache server 7 as the delivery destination for the contents ID and contents data of that contents ID, and outputs data concerning the identified cache server 7 to the message transmitter 1302. The message transmitter 1302 transmits a message that includes the contents ID to the identified cache server 7. The user ID may be transmitted, additionally.

Figure 39:
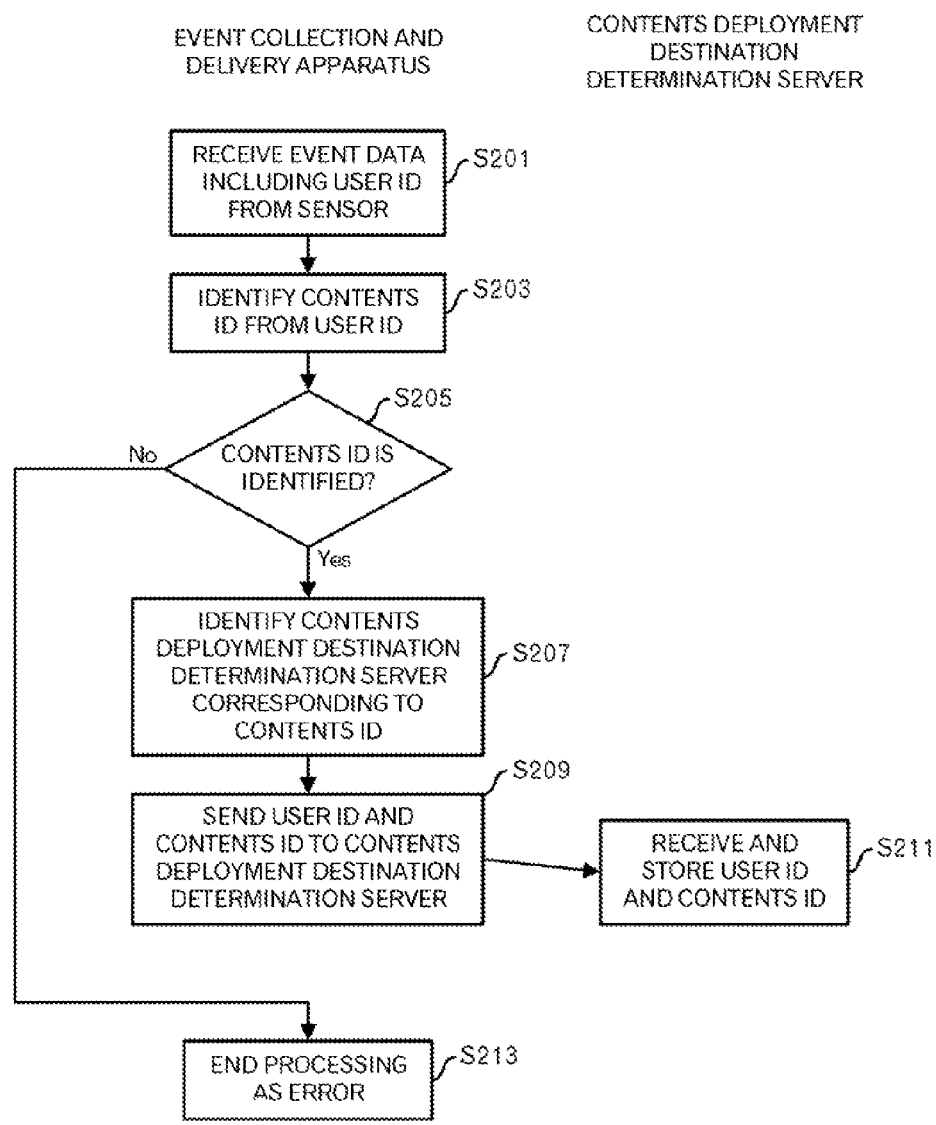
FIG. 39 is a diagram depicting a processing flow relating to the fifth embodiment.

Next, in this embodiment, the portion of the processing, which differs from that of the third embodiment, will be explained. More specifically, when the event receiver 51 of the event collection and delivery apparatus 5 receives event data (entrance event) that includes a user ID from a sensor 9 at an entrance, for example (FIG. 39: step S201), the event receiver 51 outputs that event data to the server selector 58. When the server selector 58 receives the event data, the server selector 58 searches the third management table 533 by using the user ID that is included in the event data to identify a correlated contents ID (step S203).

In this embodiment, display apparatus IDs that correspond to a user ID are registered beforehand, in the third management table 533, however, there are cases in which registration is not performed in time. In such a case, the user ID that is included in the event data is not found in the third management table 533, so it is not possible to identify a contents ID. In such a case (step S205: NO route), in this embodiment, the processing ends as an error (step S213).

On the other hand, when a contents ID can be identified (step S205: YES route), the server selector 58 searches the fourth management table 534 with the contents ID to identify the address of the contents deployment destination determination server 13 that corresponds to the contents ID (step S207), and outputs the user ID, contents ID and address of the contents deployment destination determination server 13 to the message transmitter 59. When the message transmitter 59 receives the user ID, contents ID and address of the contents deployment destination determination server 13, the message transmitter 59 transmits a message that includes the user ID and contents ID to the address of the contents deployment destination determination server 13 (step S209).

When the message receiver 1303 of the contents deployment destination determination server 13 receives a message that includes the contents ID and user ID, the message receiver 1303 outputs that message to the registration unit 1301. When the registration unit 1301 receives the message, the registration unit 1301 registers the contents ID and user ID that are included in the message in the user access list 3141*c* (step S211).

By performing this processing, as for a specific set of contents, the user IDs of the users that are the delivery destinations of the contents are collected in the contents deployment destination determination server 13 that is in charge of the specific set of contents, so it becomes possible to efficiently narrow down the cache server 7 in which the contents data is to be stored. In other words, it is possible to improve the efficiency of utilization in the capacity of the cache server 7.

The following processing is the same as the processing that is performed by the cache server 7 in the third embodiment.

The processing may be changed so that only the user ID is transmitted, and the contents ID is identified by preparing and using a management table in advance in the contents deployment destination determination server 13.

Embodiment 6

In the third to fifth embodiments, the transmission destination determining units 316 to 316c select a cache server 7 without taking into consideration the capacity of the second data storage unit 76 that stores the contents data in the cache server 7.

Figures 40, 42:
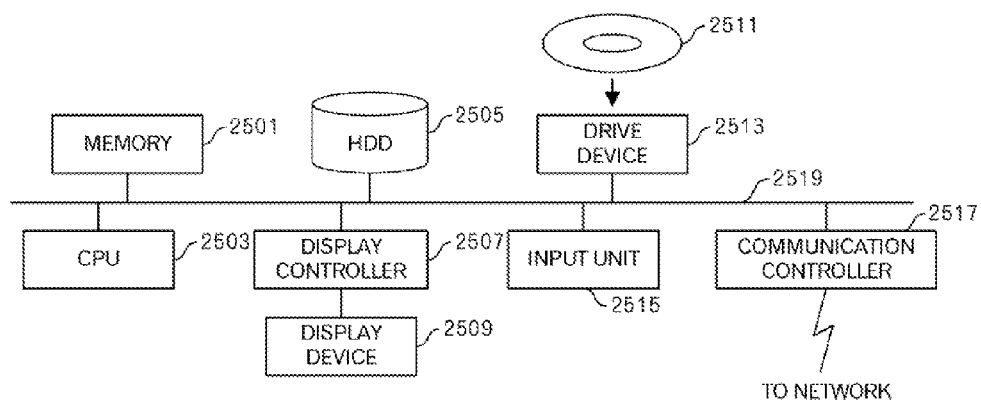
FIG. 40 is a diagram depicting an example of data stored in a sixth management table relating to a sixth embodiment.
FIG. 42 is a functional block diagram of a computer.

Then, for example, a sixth management table such as illustrated in FIG. 40 is prepared in advance in the third data storage units 315 to 315c that the transmission destination determining units 316 to 316c access. In the example in FIG. 40, the number of contents is registered in association with the CS address. As for the data of the sixth management table, the transmission destination determining units 316 to 316c or another special module or the like updates the data by periodically obtaining the data for the number of contents stored in the cache server 7 from each cache server 7.

Figure 41:
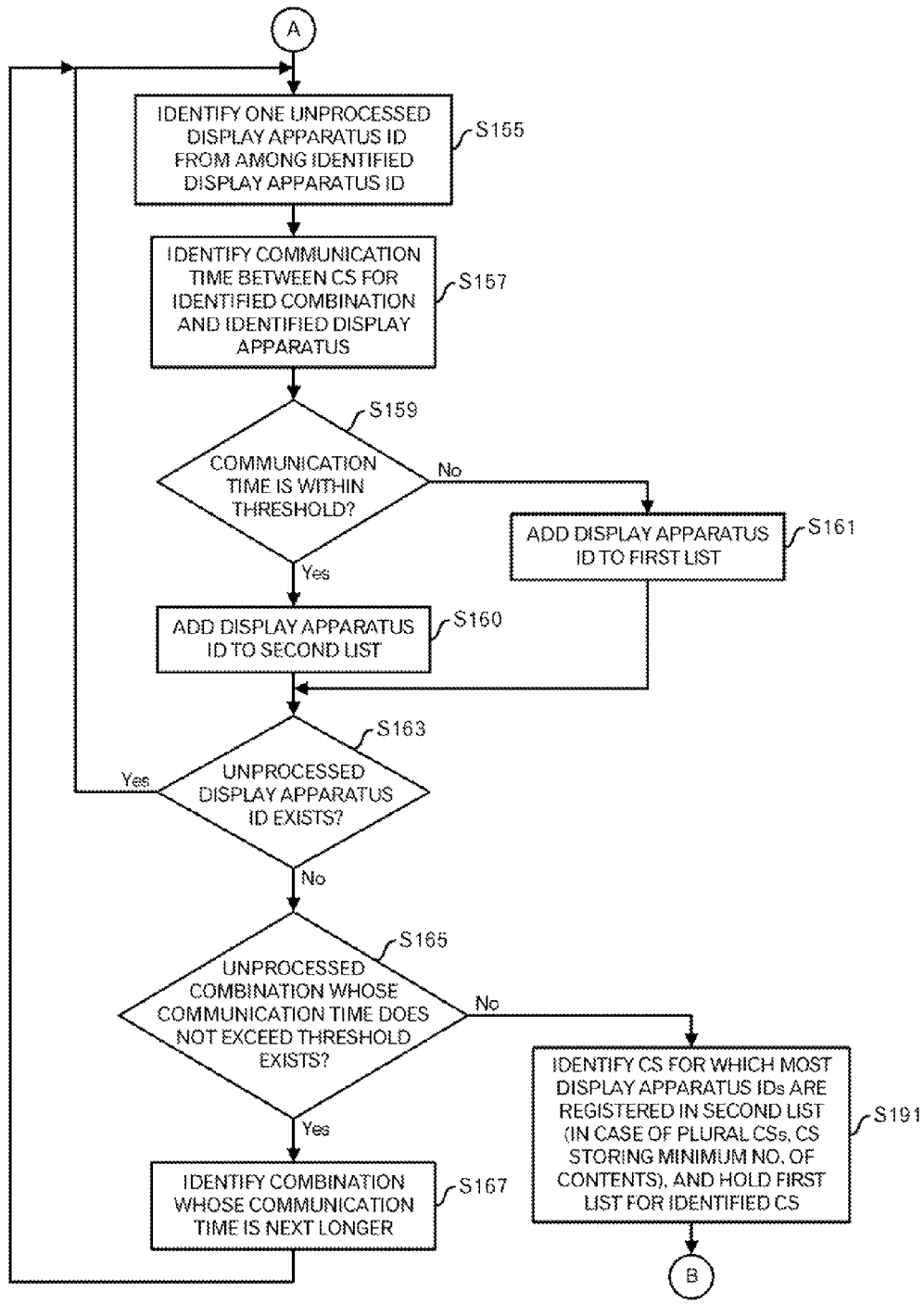
FIG. 41 is a diagram depicting a processing flow relating to the sixth embodiment.

In doing so, teleprocessing by the transmission destination determining units 316 to 316c illustrated in FIG. 29 is changed as illustrated in FIG. 41, for example. The portion that is different is step S191, in which, when the transmission destination determining units 316 to 316c try to identify one cache server 7 and there are plural cache servers 7 for which the most display apparatus IDs are registered in the second list, the transmission destination determining units 316 to 316c read the number of contents for the cache servers 7 from the sixth management table, and identify the server having the least number of contents as the cache server 7 to be used (step S191). By performing the processing such as described above, when there are cache servers 7 having the same rank, the cache server 7 having more empty capacity is identified.

This embodiment can be applied to the third to the fifth embodiments.

Although the embodiments of this technique were explained above, this technique is not limited to the embodiments. For example, the functional block diagrams of the aforementioned servers are mere examples, and do not correspond to program module configurations. In addition, as for the processing flow, as long as the same results can be obtained, an order of the steps may be changed, or plural steps may be executed in parallel.

Furthermore, in the aforementioned example, the entrance sensor and exit sensor are provided at the entrance and exit of the building or the like. However, this application example is a mere example. For example, the embodiments may be applied to a case where the entrance and exit management is carried out at the gates in the stations. In such a case, many variations exist as to where the center server 3 should be arranged, and for example, one center server 3 may be provided for each of plural stations. In such a case, as for the third embodiment and its variations, not only the user ID but also a place ID to identify the station are managed, and when plural entries whose contents ID and place ID are the same are found, the processing is carried out.

Furthermore, each server may be implemented by not only one computer but also plural computers.

Furthermore, matters described in one embodiment may be applied to another embodiment.

In addition, the aforementioned event collection and delivery apparatus 5, cache server 7, center server 3 and contents deployment destination determination server 13 and the like are computer devices as illustrated in FIG. 42. That is, a memory 2501 (storage device), a CPU 2503 (processor), a hard dish drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 42. An operating system (OS) and an application program for carrying out the foregoing processing in the embodiments, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are summarized as follows:

A system relating to a first aspect of the embodiments includes: (A) a first information processing apparatus having data of a plurality of contents; (B) a plurality of display apparatuses, each having a function to read an identifier of a user; (C) a plurality of second information processing apparatus, each of which identifies data of contents to be outputted at least one of the plurality of display apparatuses, based on an identifier of a user, obtains from the first information processing apparatus and caches the data of contents, and outputs corresponding data of contents in response to a request including an identifier of a user from the at least one display apparatus; and (D) a third information processing apparatus having a first data storage unit storing first correlation data to correlate an identifier of a user with at least one second information processing apparatus of the plurality of second information processing apparatuses, wherein, when detecting a predetermined event including an identifier of a user, from the first data storage unit, the third information processing apparatus identifies a second information processing apparatus, which is correlated with the identifier of the user, which is included in the detected predetermined event, and transmits the identifier of the user, which is included in the detected predetermined event, to the identified second information processing apparatus.

Thus, it is possible to reduce the processing load of the first information processing apparatus, and improve the processing efficiency in the overall system.

In addition, each of the plurality of second information processing apparatuses may further include a second data storage unit storing second correlation data to correlate an identifier of a user with an identifier of contents and third correlation data to correlate an identifier of contents and an address of a storage destination of the contents with an identifier of a user who was lastly correlated with the contents. Then, when receiving first data including a first user identifier from the third information processing apparatus, each of the plurality of second information processing apparatuses may identify an identifier of contents correlated with the first user identifier from the second correlation data, and may determine whether or not data is correlated with the identified identifier of the contents in the third correlation data. When no data is correlated with the identified identifier of the contents, each of the plurality of second information processing apparatuses may obtain data of the contents from the first information processing apparatus, and may store the obtained data into a third data storage unit, and may further store second correlation data to correlate the identified identifier of the contents, the first user identifier included in the first data with an address of a storage destination of the obtained data of the contents in the second data storage unit. When the data is correlated with the identified identifier of the contents, each of the plurality of the second information processing apparatuses may update an identifier of a user, which is included in the data with the first user identified included in the first data. When receiving second data including the first user identifier from the third information processing apparatus, each of the plurality of second information processing apparatuses may determine whether or not the third correlation data includes data with which the first user identifier included in the second data is correlated. When the third correlation data includes the data with which the first user identifier included in the second data is correlated, each of the plurality of second information processing apparatuses may delete the data with which the first user identifier is correlated and may delete data of contents stored at an address of a storage destination of the data of the contents, which is included in the data with which the first user identifier is correlated.

Thus, efficiency of the cache capacity in the second information processing apparatus can be improved.

A system relating to a second aspect of the embodiments includes: (A) a first information processing apparatus having a first data storage unit storing data of a plurality of contents; (B) a plurality of display apparatuses, each including a function to read an identifier of a user; (C) a plurality of second information processing apparatuses, each of which obtains from the first information processing apparatus and caches data of contents to be outputted to at least one display apparatus of the plurality of display apparatuses, and outputs corresponding data of contents in response to a request including an identifier of a user from the at least one display apparatus; and (D) a third information processing apparatus that transmits data including an identifier of a user to the first information processing apparatus, upon detecting a predetermined event including the identifier of the user. Then, the first information processing apparatus further includes a second data storage unit storing first correlation data to correlate an identifier of a user with an identifier of contents, second correlation data to correlate an identifier of a display apparatus with an identifier of a user, and third correlation data to correlate an identifier of a display apparatus with one or plural identifiers of one or plural second information processing apparatuses. When receiving the data including the identifier of the user from the third information processing apparatus, the first information processing apparatus identifies an identifier of contents, which is correlated with the identifier of the user, which is included in the received data, from the first correlation data, and stores data to correlate the identifier of the user, which is included in the received data, with the identified identifier of the contents in a third data storage unit. When the third data storage unit stores data to correlate a same identifier of contents with plural identifiers of plural users, the first information processing apparatus identifies an identifier of a display apparatus, which is correlated with each of the plural identifiers of the plural users, from the second correlation data, and extracts from the third correlation data, an identifier of a second information processing apparatus, which is correlated with the identified identifier of the display apparatus. When a same identifier of a second information processing apparatus is extracted for at least two identifiers of at least two users among the plural identifiers of the plural users, the first information processing apparatus reads from the first data storage unit and transmits data of the contents, for which the same identifier is identified, to the second information processing apparatus for which the same identifier is extracted or transmits the same identifier of the contents to the second information processing apparatus for which the same identifier is extracted.

By doing so, the second information processing apparatus which is the delivery destination of the contents data is narrowed without delivering the contents data for each user, when the same contents are outputted to plural users almost at the same time. In other words, it is possible to reduce the bandwidth used in the network, and to improve the efficiency of the cache capacity in the second information processing apparatus.

In addition, the identifier of the display apparatus and the one or plural identifiers of the one or plural second information processing apparatuses may be correlated in the third correlation data with a throughput between the display apparatus and the one or plural second information processing apparatuses. Moreover, the second data storage unit may further store size data of contents for each of the plurality of contents. In such a case, when the same identifier of the second information processing apparatus is extracted for the at least two identifiers of the at least two users among the plural identifiers of the plural users, and a communication time calculated by using a size of the contents for which the same identifier is identified and a throughput between a display apparatus identified for the at least two identifiers of the at least two users and the second information processing apparatus for which the same identifier is extracted is within a threshold, the first information processing apparatus may read from the first data storage unit and may transmit data of the contents, for which the same identifier is identified, to the second information processing apparatus for which the same identifier is extracted or may transmit the same identifier of the contents to the second information processing apparatus for which the same identifier is extracted.

Thus, it is possible to avoid that the time required to output the contents for the user from the display apparatus becomes longer than a predetermined reference.

Furthermore, the second data storage unit may further store data of the number of contents cached in each of the plurality of second information processing apparatuses. When there are plural second information processing apparatuses for which the same identifier is extracted, one of the second information processing apparatuses for which the same identifier is extracted may be selected based on the number of contents, which is stored in the second data storage unit. This processing is carried out in order to avoid that large imbalance in the number of contents cached in each of the second information processing apparatuses occurs.

A system relating to a third aspect of the embodiments includes: (A) a first information processing apparatus having a first data storage unit storing data of a plurality of contents;

(B) a plurality of display apparatuses, each including a function to read an identifier of a user; (C) a plurality of second information processing apparatuses, each of which identifies data of contents to be outputted to at least one display apparatus of the plurality of display apparatuses based on an identifier of a user, and obtains and caches the identified data of the contents from the first information processing apparatus, and outputs corresponding data of contents in response to a request including an identifier of a user from the at least one display apparatus; and (D) a third information processing apparatus comprising a second data storage unit storing first correlation data to correlate an identifier of a user with an identifier of contents, second correlation data to correlate an identifier of a display apparatus with an identifier of a user, and third correlation data to correlate an identifier of a display apparatus with one or plural identifiers of one or plural second information processing apparatuses, and a third data storage unit. When a predetermined event including an identifier of a user, the third information processing apparatus identifies, from the first correlation data, an identifier of contents, which is correlated with the identifier of the user, which is included in the detected predetermined event, and stores data to correlate the identified identifier of the contents with the identifier of the user, which is included in the detected predetermined event in the third data storage unit. When the third data storage unit stores data to correlate a same identifier of contents with plural identifiers of plural users, the third information processing apparatus identifies an identifier of a display apparatus, which is correlated with each of the plural identifiers of the plural users, from the second correlation data, and extracts from the third correlation data, an identifier of a second information processing apparatus, which is correlated with the identified identifier of the display apparatus. When a same identifier of a second information processing apparatus is extracted for at least two identifiers of at least two users among the plural identifiers of the plural users, the third information processing apparatus transmits the at least two identifiers of the at least two users or the same identifier of the contents to the second information processing apparatus for which the same identifier is extracted.

By adopting such a system configuration, it is possible to avoid that the processing load of the first information processing apparatus becomes high, to increase the processing efficiency of the entire system, and to improve the efficiency of the cache capacity in the second information processing apparatus.

Moreover, the aforementioned second data storage unit may further store data of the number of contents cached in each of the plurality of second information processing apparatuses. When there are plural second information processing apparatuses for which the same identifier is extracted, one of the second information processing apparatuses for which the same identifier is extracted may be selected based on the number of contents, which is stored in the third data storage unit.

Thus, it is possible to avoid that large imbalance in the number of contents cached in each of the second information processing apparatuses occurs.

Furthermore, the identifier of the display apparatus and the one or plural identifiers of the one or plural second information processing apparatuses may be correlated in the third correlation data with a throughput between the display apparatus and the one or plural second information processing apparatuses. In addition, the aforementioned second data storage unit may further store size data of contents for each of the plurality of contents. In such a case, when the same identifier of the second information processing apparatus is extracted for the at least two identifiers of the at least two user's among the plural identifiers of the plural users, and a communication time calculated by using a size of the contents for which the same identifier is identified and a throughput between a display apparatus identified for the at least two identifiers of the at least two users and the second information processing apparatus for which the same identifier is extracted is within a threshold, the third information processing apparatus may transmit the at least two identifiers of the at least two users or the same identifier of the contents to the second information processing apparatus for which the same identifier is extracted.

Without caching the contents data for each user, the second information processing apparatus is narrowed, which caches the contents data when the same contents are outputted for plural users almost at the same time. In other words, it is possible to reduce the bandwidth being used in the network, and to improve the efficiency of the cache capacity in the second information processing apparatus.

A system relating to a fourth aspect of the embodiments includes: (A) a first information processing apparatus having a first data storage unit storing data of a plurality of contents; (B) a plurality of display apparatuses, each including a function to read an identifier of a user; (C) a plurality of second information processing apparatuses, each of which identifies data of contents to be outputted to at least one display apparatus of the plurality of display apparatuses based on an identifier of a user or an identifier of contents, and obtains and caches the identified data of the contents from the first information processing apparatus, and outputs corresponding data of contents in response to a request including an identifier of a user from the at least one display apparatus; (D) a plurality of third information processing apparatuses; and (E) a fourth information processing apparatus comprising a second data storage unit storing first correlation data to correlate an identifier of a user with an identifier of contents and second correlation data to correlate an identifier of contents with one of the plurality of third information processing apparatuses.

Then, when a predetermined event including an identifier of a user, the fourth information processing apparatus identifies, from the first correlation data, an identifier of contents, which is correlated with the identifier of the user, which is included in the detected predetermined event, and identifies an identifier of a third information processing apparatus, which is correlated with the identified identifier of the contents, from the second correlation data, and transmits data including the identifier of the user, which is included in the detected predetermined event, and the identified identifier of the contents or data including the identifier of the user, which is included in the detected predetermined event, to the third information processing apparatus whose identifier is identified. Furthermore, each of the plurality of third information processing apparatuses comprises a third data storage unit storing second correlation data to correlate an identifier of a user with an identifier of a display apparatus and third correlation data to correlate an identifier of a display apparatus with one or plural identifiers of one or plural second information processing apparatuses. Each of the plurality of third information processing apparatuses stores data to correlate the identifier of the user which is included in the data received from the fourth information processing apparatus with the identifier of the contents, which is included in the data received from the fourth information processing apparatus in a fourth data storage unit, or identifies an identifier of contents, which corresponds to the identifier of the user, which is included in the data received from the fourth information processing apparatus to store data to correlate the identifier of the user with the identified identifier of the contents, into the fourth data storage unit. When the fourth data storage unit stores data to correlate plural identifiers of plural users with a same identifier of contents, each of the plurality of third information processing apparatuses identifies, from the second correlation data, an identifier of a display apparatus, which is correlated with each of the plural identifiers of the plural users, and extracts from the third correlation data, an identifier of a second information processing apparatus, which is correlated with the identified identifier of the display apparatuses. When a same identifier of a second in formation processing apparatus is extracted for at least two identifiers of at least two users among the plural identifiers of the plural users, each of the plurality of third information processing apparatuses transmits the at least two identifiers of the at least two user's or the same identifier of the contents to the second information processing apparatus for which the same identifier is extracted.

Thus, because data of combinations of the identifier of the contents and the identifier of the user is collected based on the identifier of the contents, cases where plural identifiers of plural users are associated with the same identifier of the contents increase, and the aggregation of the second information processing apparatuses, which obtains the data of the contents to be outputted to the plural users, can be effective carried out. Furthermore, if is possible to avoid that the processing load of the first information processing apparatus becomes high, and to improve the efficiency of the cache capacity in the second information processing apparatus.

In addition, the identifier of the display apparatus and the one or plural identifiers of the one or plural second information processing apparatuses may be correlated in the third correlation data with a throughput between the display apparatus and the one or plural second information processing apparatuses. Moreover, the aforementioned third data storage unit may further store size data of contents for each of the plurality of contents. In such a case, when the same identifier of the second information processing apparatus is extracted for the at least two identifiers of the at least two users among the plural identifiers of the plural users, and a communication time calculated by using a size of the contents for which the same identifier is identified and a throughput between a display apparatus identified for the at least two identifiers of the at least two users and the second information processing apparatus for which the same identifier is extracted is within a threshold, each of the plurality of third information processing apparatuses may transmit the at least two identifiers of the at least two users or the same identifier of the contents to the second information processing apparatus for which the same identifier is extracted.

Incidentally, it is possible to create a program causing a computer to execute the aforementioned processing, and such a program is stored in a computer readable storage medium or storage device such as a flexible dish, CD-ROM, DVD-ROM, magneto-optic dish, a semiconductor memory, and hard disk.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A system, comprising:
a first information processing apparatus having data of a plurality of contents;
a plurality of display apparatuses, each including a function to read an identifier of a user from a user device that stores the identifier of the user;
a plurality of second information processing apparatuses, each of which obtains and stores portion of data of the plurality of contents from the first information processing apparatus, and outputs stored data to at least one of the plurality of display apparatuses; and
a third information processing apparatus that detects a predetermined event, and
wherein the third information processing apparatus comprises a first data storage unit storing first correlation data to correlate an identifier of a user with at least one second information processing apparatus of the plurality of second information processing apparatuses,
upon detecting the predetermined event, the third information processing apparatus identifies a second information processing apparatus correlated with an identifier of a user, which is included in data of the detected predetermined event, from the first data storage unit, and transmits the identifier of the user, which is included in the detected predetermined event, to the identified second information processing apparatus,
upon receipt of the identifier of the user from the third information processing apparatus, at least one second information processing apparatus of the plurality of second information processing apparatuses identifies data of contents to be outputted to the at least one of the plurality of display apparatuses based on the identifier of the user, which is transmitted from the third information processing apparatus, and obtains and stores the identified data from the first information processing apparatus, and
upon receipt of the identifier of the user from the at least one of the plurality of display apparatuses, the at least one second information processing apparatus outputs data of contents corresponding to the identifier of the user to the at least one of the plurality of display apparatuses.

2. The system as set forth in claim 1, wherein each of the plurality of second information processing apparatuses further comprises a second data storage unit storing second correlation data to correlate an identifier of a user with an identifier of contents and third correlation data to correlate an identifier of contents and an address of a storage destination of the contents with an identifier of a user who was lastly correlated with the contents, and
wherein, upon receipt of first data including a first user identifier from the third information processing apparatus, each of the plurality of second information processing apparatuses identifies an identifier of contents correlated with the first user identifier from the second correlation data, and determines whether or not data is correlated with the identified identifier of the contents in the third correlation data,
upon detecting that no data is correlated with the identified identifier of the contents, each of the plurality of second information processing apparatuses obtains data of the contents from the first information processing apparatus, and stores the obtained data into a third data storage unit, and further stores second correlation data to correlate the identified identifier of the contents, the first user identifier included in the first data with an address of a storage destination of the obtained data of the contents in the second data storage unit, upon detecting that the data is correlated with the identified identifier of the contents, each of the plurality of the second information processing apparatuses updates an identifier of a user, which is included in the data with the first user identifier included in the first data, upon receipt of second data including the first user identifier from the third information processing apparatus, each of the plurality of second information processing apparatuses determines whether or not the third correlation data includes data with which the first user identifier included in the second data is correlated, and upon detecting that the third correlation data includes the data with which the first user identifier included in the second data is correlated, each of the plurality of second information processing apparatuses deletes the data with which the first user identifier is correlated and deletes data of contents stored at an address of a storage destination of the data of the contents, which is included in the data with which the first user identifier is correlated.

3. A system, comprising:

a first information processing apparatus having a first data storage unit storing data of a plurality of contents;

a plurality of display apparatuses, each including a function to read an identifier of a user from a user device that stores the identifier of the user;

a plurality of second information processing apparatuses, each of which obtains from the first information processing apparatus and caches data of contents to be outputted to at least one display apparatus of the plurality of display apparatuses, and outputs corresponding data of contents in response to a request including an identifier of a user from the at least one display apparatus; and a third information processing apparatus that transmits data including an identifier of a user to the first information processing apparatus, upon detecting a predetermined event including the identifier of the user, and wherein the first information processing apparatus comprises a second data storage unit storing first correlation data to correlate an identifier of a user with an identifier of contents, second correlation data to correlate an identifier of a display apparatus with an identifier of a user, and third correlation data to correlate an identifier of a display apparatus with one or plural identifiers of one or plural second information processing apparatuses, upon receipt of the data including the identifier of the user from the third information processing apparatus, the first information processing apparatus identifies an identifier of contents, which is correlated with the identifier of the user, which is included in the received data, from the first correlation data, and stores data to correlate the identifier of the user, which is included in the received data, with the identified identifier of the contents in a third data storage unit, upon detecting that the third data storage unit stores data to correlate a same identifier of contents with plural identifiers of plural users, the first information processing apparatus identifies an identifier of a display apparatus, which is correlated with each of the plural identifiers of the plural users, from the second correlation data, and extracts from the third correlation data, an identifier of a second information processing apparatus, which is correlated with the identified identifier of the display apparatus, and upon detecting that a same identifier of a second information processing apparatus is extracted for at least two identifiers of at least two users among the plural identifiers of the plural users, the first information processing apparatus reads from the first data storage unit and transmits data of the contents, for which the same identifier is identified, to the second information processing apparatus for which the same identifier is extracted or transmits the same identifier of the contents to the second information processing apparatus for which the same identifier is extracted.

4. The system as set forth in claim 3, wherein the identifier of the display apparatus and the one or plural identifiers of the one or plural second information processing apparatuses are correlated in the third correlation data with a throughput between the display apparatus and the one or plural second information processing apparatuses, the second data storage unit further stores size data of contents for each of the plurality of contents, and upon detecting that the same identifier of the second information processing apparatus is extracted for the at least two identifiers of the at least two users among the plural identifiers of the plural users, and a communication time calculated by using a size of the contents for which the same identifier is identified and a throughput between a display apparatus identified for the at least two identifiers of the at least two users and the second information processing apparatus for which the same identifier is extracted is within a threshold, the first information processing apparatus reads from the first data storage unit and transmits data of the contents, for which the same identifier is identified, to the second information processing apparatus for which the same identifier is extracted or transmits the same identifier of the contents to the second information processing apparatus for which the same identifier is extracted.

5. The system as set forth in claim 3, wherein the second data storage unit further stores data of a number of contents cached in each of the plurality of second information processing apparatuses, and one of the second information processing apparatuses for which the same identifier is extracted is selected based on the number of contents, which is stored in the second data storage unit.

6. A system, comprising:

a first information processing apparatus having a first data storage unit storing data of a plurality of contents;

a plurality of display apparatuses, each including a function to read an identifier of a user from a user device that stores the identifier of the user;

a plurality of second information processing apparatuses, each of which identifies data of contents to be outputted to at least one display apparatus of the plurality of display apparatuses based on an identifier of a user, and obtains and caches the identified data of the contents from the first information processing apparatus, and outputs corresponding data of contents in response to a request including an identifier of a user from the at least one display apparatus; and a third information processing apparatus comprising a second data storage unit storing first correlation data to correlate an identifier of a user with an identifier of contents, second correlation data to correlate an identifier of a display apparatus with an identifier of a user, and third correlation data to correlate an identifier of a display apparatus with one or plural identifiers of one or plural second information processing apparatuses, and a third data storage unit, and wherein, upon detecting a predetermined event including an identifier of a user, the third information processing apparatus identifies, from the first correlation data, an identifier of contents, which is correlated with the identifier of the user, which is included in the detected predetermined event, and stores data to correlate the identified identifier of the contents with the identifier of the user, which is included in the detected predetermined event in the third data storage unit, upon detecting that the third data storage unit stores data to correlate a same identifier of contents with plural identifiers of plural users, the third information processing apparatus identifies an identifier of a display apparatus, which is correlated with each of the plural identifiers of the plural users, from the second correlation data, and extracts from the third correlation data, an identifier of a second information processing apparatus, which is correlated with the identified identifier of the display apparatus, and upon detecting that a same identifier of a second information processing apparatus is extracted for at least two identifiers of at least two users among the plural identifiers of the plural users, the third information processing apparatus transmits the at least two identifiers of the at least two users or the same identifier of the contents to the second information processing apparatus for which the same identifier is extracted.

7. The system as set forth in claim 6, wherein the second data storage unit further stores data of a number of contents cached in each of the plurality of second information processing apparatuses, and
   one of the second information processing apparatuses for which the same identifier is extracted is selected based on the number of contents, which is stored in the second data storage unit.

8. The system as set forth in claim 6, wherein the identifier of the display apparatus and the one or plural identifiers of the one or plural second information processing apparatuses are correlated in the third correlation data with a throughput between the display apparatus and the one or plural second information processing apparatuses,
   the second data storage unit further stores size data of contents for each of the plurality of contents, and
   upon detecting that the same identifier of the second information processing apparatus is extracted for the at least two identifiers of the at least two users among the plural identifiers of the plural users, and a communication time calculated by using a size of the contents for which the same identifier is identified and a throughput between a display apparatus identified for the at least two identifiers of the at least two users and the second information processing apparatus for which the same identifier is extracted is within a threshold, the third information processing apparatus transmits the at least two identifiers of the at least two users or the same identifier of the contents to the second information processing apparatus for which the same identifier is extracted.

9. A system, comprising:
a first information processing apparatus having a first data storage unit storing data of a plurality of contents;
a plurality of display apparatuses, each including a function to read an identifier of a user from a user device that stores the identifier of the user;
a plurality of second information processing apparatuses, each of which identifies data of contents to be outputted to at least one display apparatus of the plurality of display apparatuses based on an identifier of a user or an identifier of contents, and obtains and caches the identified data of the contents from the first information processing apparatus, and outputs corresponding data of contents in response to a request including an identifier of a user from the at least one display apparatus;
a plurality of third information processing apparatuses; and
a fourth information processing apparatus comprising a second data storage unit storing first correlation data to correlate an identifier of a user with an identifier of contents and second correlation data to correlate an identifier of contents with one of the plurality of third information processing apparatuses, and wherein, upon detecting a predetermined event including an identifier of a user, the fourth information processing apparatus identifies, from the first correlation data, an identifier of contents, which is correlated with the identifier of the user, which is included in the detected predetermined event, and identifies an identifier of a third information processing apparatus, which is correlated with the identified identifier of the contents, from the second correlation data, and transmits data including the identifier of the user, which is included in the detected predetermined event, and the identified identifier of the contents or data including the identifier of the user, which is included in the detected predetermined event, to the third information processing apparatus whose identifier is identified, each of the plurality of third information processing apparatuses comprises a third data storage unit storing second correlation data to correlate an identifier of a user with an identifier of a display apparatus and third correlation data to correlate an identifier of a display apparatus with one or plural identifiers of one or plural second information processing apparatuses, each of the plurality of third information processing apparatuses stores data to correlate the identifier of the user, which is included in the data received from the fourth information processing apparatus with the identifier of the contents, which is included in the data received from the fourth information processing apparatus in a fourth data storage unit, or identifies an identifier of contents, which corresponds to the identifier of the user, which is included in the data received from the fourth information processing apparatus to store data to correlate the identifier of the user with the identified identifier of the contents, into the fourth data storage unit, upon detecting that the fourth data storage unit stores data to correlate plural identifiers of plural users with a same identifier of contents, each of the plurality of third information processing apparatuses identifies, from the second correlation data, an identifier of a display apparatus, which is correlated with each of the plural identifiers of the plural users, and extracts, from the third correlation data, an identifier of a second information processing apparatus, which is correlated with the identified identifier of the display apparatuses, and upon detecting that a same identifier of a second information processing apparatus is extracted for at least two identifiers of at least two users among the plural identifiers of the plural users, each of the plurality of third information processing apparatuses transmits the at least two identifiers of the at least two users or the same identifier of the contents to the second information processing apparatus for which the same identifier is extracted.

10. The system as set forth in claim 9, wherein the identifier of the display apparatus and the one or plural identifiers of the one or plural second information processing apparatuses are correlated in the third correlation data with a throughput between the display apparatus and the one or plural second information processing apparatuses, the third data storage unit further stores size data of contents for each of the plurality of contents, and upon detecting that the same identifier of the second information processing apparatus is extracted for the at least two identifiers of the at least two users among the plural identifiers of the plural users, and a communication time calculated by using a size of the contents for which the same identifier is identified and a throughput between a display apparatus identified for the at least two identifiers of the at least two users and the second information processing apparatus for which the same identifier is extracted is within a threshold, each of the plurality of third information processing apparatuses transmits the at least two identifiers of the at least two users or the same identifier of the contents to the second information processing apparatus for which the same identifier is extracted.

11. A computer-readable, non-transitory storage medium storing a program for causing a computer to execute a process, the process comprising:

detecting a predetermined event including an identifier of a user;

identifying an identifier of a second information processing apparatus, which is correlated with the identifier of the user, which is included in the detected predetermined event, from a data storage unit storing correlation data to correlate an identifier of a user with a second information processing apparatus that identifies, based on an identifier of a user, data of contents to be outputted to at least one of a plurality of display apparatuses, each of which has a function to read an identifier of a user from a user device that stores the identifier of the user, obtains from a first information processing apparatus having data of a plurality of contents and caches the data of the contents upon receipt of the identifier of the user from the computer, and outputs corresponding data of contents in response to a request including an identifier of a user; and transmitting at least the identifier of the user, which is included in the predetermined event, to the second information processing apparatus whose identifier is identified.

12. A computer-readable, non-transitory storage medium storing a program for causing a computer to execute a process, the process comprising:

receiving data including an identifier of a user from an information processing apparatus that detected a predetermined event including the identifier of the user;

identifying an identifier of contents, which is correlated with the identifier of the user, which is included in the received data, from first correlation data to correlate an identifier of a user with an identifier of contents, wherein a first data storage unit stores the first correlation data, second correlation data to correlate one or plural identifiers of one or plural display apparatuses among a plurality of display apparatuses, each of which has a function to read an identifier of a user from a user device that stores the identifier of the user, with an identifier of a user, and third correlation data to correlate one or plural identifiers of one or plural second information processing apparatuses among a plurality of second information processing apparatuses, with an identifier of a display apparatus, wherein each of the plurality of second information processing apparatuses obtains and caches data of contents to be outputted to at least one display apparatus of the plurality of display apparatuses, and outputs corresponding data of contents in response to a request including an identifier of a user from the at least one display apparatus;

storing data to correlate the identifier of the user, which is included in the received data, with the identified identifier of the contents, into a second data storage unit;

upon detecting that the second data storage unit stores data to correlate plural identifiers of plural users with a same identifier of contents, identifying, from the second correlation data, an identifier of a display apparatus, which is correlated with each of the plural identifiers of the plural users;

extracting, from the third correlation data, an identifier of a second information processing apparatus, which is correlated with the identified identifier of the display apparatus; and upon detecting that a same identifier of the second information processing apparatus is extracted for at least two identifiers of at least two users among the plural identifiers of the plural users, reading from the first data storage unit, and transmitting the data of the contents for which the same identifier is identified to the second information processing apparatus for which the same identifier is extracted, or transmitting the same identifier of the contents to the second information processing apparatus for which the same identifier is extracted.

13. A computer-readable, non-transitory storage medium storing a program for causing a computer to execute a process, the process comprising:

detecting a predetermined event including the identifier of the user;

identifying an identifier of contents, which is correlated with the identifier of the user, which is included in the detected predetermined event, from first correlation data to correlate an identifier of a user with an identifier of contents, wherein a first data storage unit stores the first correlation data, second correlation data to correlate one or plural display apparatuses of a plurality of display apparatuses, each of which has a function to read an identifier of a user from a user device that stores the identifier of the user, with an identifier of a user, and third correlation data to correlate one or plural identifiers of one or plural second information processing apparatuses among a plurality of second information processing apparatuses with an identifier of a display apparatus, wherein each of the plurality of second information processing apparatuses obtains from a first information processing apparatus, and caches data of contents to be outputted to at least one display apparatus of the plurality of display apparatuses, and outputs corresponding data of contents in response to a request including an identifier of a user from the at least one display apparatus;

storing data to correlate the identifier of the user, which is included in the detected predetermined event, with the identified identifier of the contents, into a second data storage unit;

upon detecting that the second data storage unit stores data to correlate plural identifiers of plural users with a same identifier of contents, identifying, from the second correlation data, an identifier of a display apparatus, which is correlated with each of the plural identifiers of the plural users;

extracting, from the third correlation data, an identifier of a second information processing apparatus, which is correlated with the identified identifier of the display apparatus; and upon detecting that a same identifier of the second information processing apparatus is extracted for at least two identifiers of at least two users among the plural identifiers of the plural users, transmitting the at least two identifiers of the at least two users or the same identifier of the contents to the second information processing apparatus for which the same identifier is extracted.

14. A computer-readable, non-transitory storage medium storing a program for causing a computer to execute a process, the process comprising:

upon receiving data including an identifier of contents and an identifier of a user from an apparatus that detected a predetermined event that includes the identifier of the user or upon receiving data including the identifier of the user from the apparatus, and identifying an identifier of contents from correlation data to correlate an identifier of a user with an identifier of contents, storing second data to correlate the identifier of the contents with the identifier of the user, which is included in the received data, into a first data storage unit;

upon detecting that the first data storage unit stores data to correlate plural identifiers of plural users with a same identifier of contents, identifying an identifier of a display apparatus, which is correlated with each of the plural identifiers of the plural users, from first correlation data to correlate one or plural identifiers of one or plural display apparatuses among a plurality of display apparatuses each having a function to read an identifier of a user from a user device that stores the identifier of the user, with an identifier of a user, wherein a second data storage unit stores the first correlation data, and second correlation data to correlate one or plural identifiers of one or plural second information processing apparatuses among a plurality of second information processing apparatuses, wherein each of the plurality of second information processing apparatuses obtains from a first information processing apparatus, and caches data of contents to be outputted to at least one display apparatus of the plurality of display apparatuses, and outputs corresponding data of contents in response to a request including an identifier of a user from the at least one display apparatus;

extracting, from the second correlation data, an identifier of a second information processing apparatus, which is correlated with the identified identifier of the display apparatus; and upon detecting that a same identifier of the second information processing apparatus is extracted for at least two identifiers of at least two users among the plural identifiers of the plural users, transmitting the at least two identifiers of the at least two users or the same identifier of the contents to the second information processing apparatus for which the same identifier is extracted.

15. A system, comprising:

a first information processing apparatus that stores data;

a display apparatus that has a function to read a user identifier from a user device that stores the user identifier;

a second information processing apparatus; and a plurality of third information processing apparatuses, and wherein the second information processing apparatus comprises:

a data storage unit storing first correlation data to correlate a user identifier with at least one third information processing apparatus that is included in the plurality of third information processing apparatuses; and a controller that refers to the first correlation data upon detecting a predetermined event data, identifies a third information processing apparatus correlated with a first user identifier included in the predetermined event data, and transmits the first user identifier to the identified third information processing apparatus, and each of the plurality of third information processing apparatuses comprises:

a receiving unit that receives the first user identifier transmitted from the second information processing apparatus;

a storing unit that obtains from the first information processing apparatus, and stores in a storage unit, data identified based on the received first user identifier in response to receipt of the first user identifier by the receiving unit; and a controller that controls to transmit data that corresponds to a second user identifier, which was read by the display apparatus and was received from the display apparatus, and is stored in the storage unit, based on the second user identifier.

* * * * *